United States Patent
Yamada et al.

(10) Patent No.: US 11,285,394 B1
(45) Date of Patent: Mar. 29, 2022

(54) COMPUTER-READABLE NON-TRANSITORY STORAGE MEDIUM HAVING INSTRUCTIONS STORED THEREIN, GAME APPARATUS, GAME SYSTEM, AND GAME PROCESSING METHOD

(71) Applicant: Nintendo Co., Ltd., Kyoto (JP)

(72) Inventors: Yoshimitsu Yamada, Kyoto (JP); Takuhiro Dohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/330,415

(22) Filed: May 26, 2021

(30) Foreign Application Priority Data

Feb. 16, 2021 (JP) .............................. JP2021-022374

(51) Int. Cl.
*A63F 13/57* (2014.01)

(52) U.S. Cl.
CPC ................................... *A63F 13/57* (2014.09)

(58) Field of Classification Search
CPC ........ A63F 13/57; A63F 13/219; A63F 13/40; A63F 13/42; A63F 13/426; A63F 13/5255; A63F 13/5258; A63F 13/5375; A63F 13/5378; A63F 13/833; A63F 2300/6045; A63F 2300/6607; A63F 2300/6661; A63F 2300/6676
See application file for complete search history.

(56) References Cited

U.S. PATENT DOCUMENTS

| | | | | |
|---|---|---|---|---|
| 6,781,635 | B1 * | 8/2004 | Takeda | A63F 13/25 348/552 |
| 7,098,868 | B2 * | 8/2006 | Love | G06F 3/1423 345/1.1 |
| 7,559,834 | B1 * | 7/2009 | York | A63F 13/10 463/2 |
| 7,657,227 | B2 * | 2/2010 | Doan | H04M 1/72412 455/41.3 |
| 7,789,741 | B1 * | 9/2010 | Fields | A63F 13/49 463/2 |
| 8,012,025 | B2 * | 9/2011 | Hillis | A63F 13/06 463/43 |
| 8,393,966 | B2 * | 3/2013 | Yamada | A63F 13/12 463/39 |

(Continued)

FOREIGN PATENT DOCUMENTS

JP 2001-314645 A 11/2001

*Primary Examiner* — David L Lewis
*Assistant Examiner* — Matthew D Hoel
(74) *Attorney, Agent, or Firm* — Xsensus LLP

(57) ABSTRACT

In an exemplary embodiment, a player object is caused to perform a posturing action of holding an item object in an input direction of a first direction input. When a second direction input is performed during the posturing action, a first swinging action of swinging the item object in the direction is performed. Further, when a going-way direction input in which a displacement amount with respect to the origin of an operation device and not greater than a first value exceeds the first value, and a return-way direction input in which the displacement amount becomes not greater than a second value after the going-way direction input have been performed within a first time, a second swinging action of swinging the item object in at least one of the going-way direction and the return-way direction is performed.

17 Claims, 31 Drawing Sheets

(56) References Cited

U.S. PATENT DOCUMENTS

| | | | |
|---|---|---|---|
| 8,403,753 B2* | 3/2013 | Yoshikawa | A63F 13/10 463/37 |
| 8,439,733 B2* | 5/2013 | Kay | A63F 13/5375 463/7 |
| 8,444,464 B2* | 5/2013 | Boch | A63F 13/44 463/7 |
| 8,444,486 B2* | 5/2013 | Kay | A63F 13/10 463/31 |
| 8,449,360 B2* | 5/2013 | Stoddard | A63F 13/814 463/7 |
| 8,465,366 B2* | 6/2013 | Applewhite | A63F 13/847 463/36 |
| 8,515,408 B2* | 8/2013 | Kawakami | H04M 1/72403 455/418 |
| 8,550,908 B2* | 10/2013 | Booth | A63F 13/537 463/31 |
| 8,562,403 B2* | 10/2013 | Boch | A63F 13/52 463/7 |
| 8,568,234 B2* | 10/2013 | Dubrofsky | A63F 13/44 463/37 |
| 8,636,572 B2* | 1/2014 | Applewhite | A63F 13/44 463/7 |
| 8,663,013 B2* | 3/2014 | Egozy | A63F 13/46 463/42 |
| 8,678,895 B2* | 3/2014 | Teasdale | G10H 1/368 463/7 |
| 8,678,896 B2* | 3/2014 | Pitsch | G10H 3/146 463/7 |
| 8,686,269 B2* | 4/2014 | Schmidt | G10H 1/342 84/477 R |
| 8,690,670 B2* | 4/2014 | Kay | G10H 1/348 463/31 |
| 8,702,485 B2* | 4/2014 | Flury | A63F 13/54 463/7 |
| 8,874,243 B2* | 10/2014 | Bennett | A63F 13/10 700/92 |
| 9,024,166 B2* | 5/2015 | Ramos | G11B 20/10527 84/610 |
| 9,248,376 B2* | 2/2016 | Yoshikawa | A63F 13/211 |
| 9,278,286 B2* | 3/2016 | Bennett | A63F 13/10 |
| 9,358,456 B1* | 6/2016 | Challinor | A63F 13/428 |
| 9,818,225 B2* | 11/2017 | Mao | G02B 27/017 |
| 9,981,193 B2* | 5/2018 | Adams | G06K 9/00342 |
| 10,022,622 B2* | 7/2018 | Soelberg | G06F 9/44505 |
| 10,328,341 B2* | 6/2019 | Soelberg | G06F 13/102 |
| 10,357,714 B2* | 7/2019 | Challinor | G06F 3/017 |
| 10,421,013 B2* | 9/2019 | Challinor | G06F 3/017 |
| 10,675,532 B2* | 6/2020 | Soelberg | G06F 3/03543 |
| 10,870,053 B2* | 12/2020 | He | A63F 13/426 |
| 10,933,313 B2* | 3/2021 | Soelberg | A63F 13/22 |
| 11,090,557 B2* | 8/2021 | Downs | A63F 13/92 |
| 2001/0039207 A1 | 11/2001 | Horigami et al. | |
| 2004/0219980 A1* | 11/2004 | Bassett | A63F 13/5252 463/33 |
| 2005/0170889 A1* | 8/2005 | Lum | A63F 13/20 463/39 |
| 2006/0044216 A1* | 3/2006 | Love | A63F 13/00 345/1.3 |
| 2006/0079214 A1* | 4/2006 | Mertama | H04M 1/72412 455/414.1 |
| 2007/0271525 A1* | 11/2007 | Han | G06F 3/1454 715/786 |
| 2008/0090657 A1* | 4/2008 | Miller | H04N 21/6543 463/31 |
| 2008/0214273 A1* | 9/2008 | Snoddy | A63F 13/843 463/19 |
| 2008/0318687 A1* | 12/2008 | Backer | A63F 13/12 463/42 |
| 2009/0088210 A1* | 4/2009 | Choi | H04N 21/4122 455/557 |
| 2009/0143107 A1* | 6/2009 | Hotta | A63F 13/803 455/566 |
| 2009/0280905 A1* | 11/2009 | Weisman | A63F 13/52 463/40 |
| 2010/0167819 A1* | 7/2010 | Schell | A63F 13/47 463/36 |
| 2011/0111859 A1* | 5/2011 | Fiedler | H04L 67/38 463/42 |
| 2011/0115698 A1* | 5/2011 | Chung | G07F 17/3223 345/156 |
| 2011/0143840 A1* | 6/2011 | Sotoike | H04L 67/38 463/42 |
| 2011/0275437 A1* | 11/2011 | Minchella Jennings | A63F 13/98 463/38 |
| 2012/0244934 A1* | 9/2012 | Burckart | A63F 13/235 463/30 |
| 2013/0324045 A1* | 12/2013 | Shimohata | A63F 13/211 455/41.2 |
| 2014/0126754 A1* | 5/2014 | Mizuta | H04S 7/301 381/306 |
| 2014/0195912 A1* | 7/2014 | Odorovic | A63F 13/355 715/719 |
| 2014/0349748 A1* | 11/2014 | Haberman | A63F 13/77 463/31 |
| 2015/0251090 A1* | 9/2015 | Nakayama | A63F 13/30 463/42 |
| 2017/0136355 A1* | 5/2017 | Rajapakse | A63F 13/30 |
| 2017/0232348 A1* | 8/2017 | Williams | A63F 13/5375 463/31 |

* cited by examiner

COORDINATE SYSTEM OF STICK PLANE

COORDINATE SYSTEM OF PLAYER OBJECT PLANE

Fig. 14
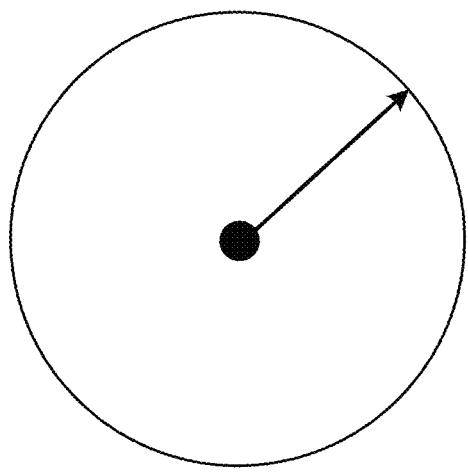
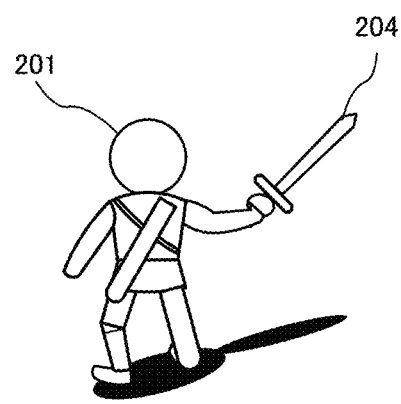
Fig. 15
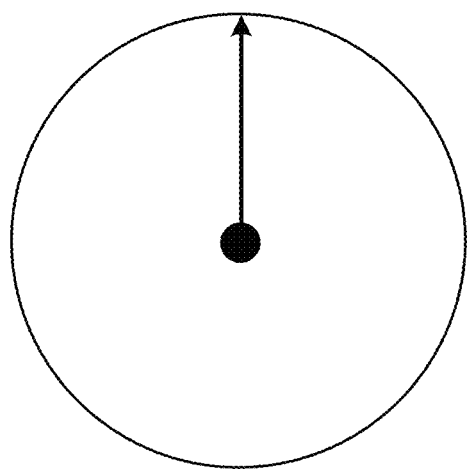
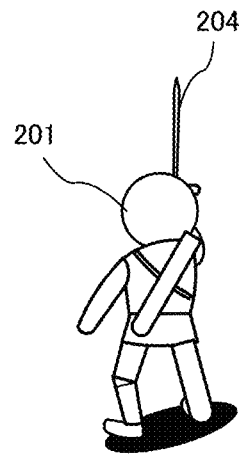

COMPUTER-READABLE NON-TRANSITORY STORAGE MEDIUM HAVING INSTRUCTIONS STORED THEREIN, GAME APPARATUS, GAME SYSTEM, AND GAME PROCESSING METHOD

CROSS-REFERENCE TO RELATED APPLICATION

This application claims priority to Japanese Patent Application No. 2021-022374 filed on Feb. 16, 2021, the entire contents of which are incorporated herein by reference.

FIELD

The exemplary embodiment herein relates to game processing that causes a player object having an item object to perform a predetermined action in a virtual space.

BACKGROUND AND SUMMARY

To date, a game in which a virtual character is caused to swing a sword by operating an analog stick, has been known. In such a game, for example, when an analog stick has been moved to a position adjacent to the original position, the character changes the posture of holding the sword. Meanwhile, in a case where the analog stick has been moved to a position not adjacent to the original position, when the movement is slow, the character changes the posture of holding the sword, and when the movement is a relatively quick movement, the character swings the sword and attacks an enemy.

In the above game, there is only one type for the operation of causing the sword to be swung in a certain direction. Thus, a variety of operations cannot be provided to the player.

Therefore, an object of the exemplary embodiment is to provide a computer-readable non-transitory storage medium having stored therein instructions (e.g., a game program) that can provide a variety of operation methods when a virtual character performs a movement of swinging a virtual object such as a sword, a game processing apparatus, a game system, and a game processing method.

Configuration examples for achieving the above object will be shown below.

One configuration example is a computer-readable non-transitory storage medium having stored therein instructions (e.g., a game program) that, when executed by a processor of a processing system, cause the processor to execute the following. That is, the processor controls, in a virtual space, a player object having an item object. On the basis of a first direction input performed on an operation device, the processor causes the player object to perform a posturing action of holding the item object in an orientation corresponding to an input direction according to the first direction input. In a case where the player object is performing the posturing action, the processor causes, on the basis of a fact that a second direction input has been performed on the operation device, the player object to perform a first swinging action of swinging the item object in an orientation corresponding to a second input direction according to the second direction input. Further, on the basis of a fact that a going-way direction input in which a displacement amount with respect to an origin in an input on the operation device and in a state of being not greater than a first value enters a state of exceeding at least the first value, and a return-way direction input in which the displacement amount enters a state of being not greater than a second value after the going-way direction input have been performed within a first time on the operation device, the processor causes the player object to perform a second swinging action of swinging the item object in an orientation based on at least one of a going-way input direction according to the going-way direction input and a return-way input direction according to the return-way direction input.

According to the above configuration example, when the player object is caused to perform an action of swinging the item object, the player object can be caused to swing the item object by each of: an operation of providing an input in a second direction in a state where the player object is holding the item in a first direction; and an operation of providing, within a predetermined time, a going-way direction input in which the displacement amount exceeds a predetermined value and a return-way direction input in which the displacement amount becomes not greater than a predetermined value. Accordingly, with respect to the operation of causing the player object to swing the item object, a variety of operations can be provided to the user.

As another configuration example, the instructions may cause the processor to cause the player object to perform the second swinging action on the basis of a fact that the going-way direction input in which the displacement amount in the state of being not greater than the first value increases to be not less than a third value, which is greater than the first value, and the return-way direction input have been performed within the first time.

According to the above configuration example, for example, a going-way direction input in which a displacement amount is large to some extent, such as a displacement reaching an end in a direction-input-allowable range of the operation device, is required. Therefore, it is possible to prevent a situation in which the second swinging action not intended by the user is performed as a result of reacting to a small displacement amount.

As another configuration example, the instructions may cause the processor to cause, in a case where the player object is performing the posturing action, the player object to perform the first swinging action on the basis of a fact that, as the second direction input, a direction input in which the displacement amount being not less than a fourth value becomes less than the fourth value and then becomes not less than a fifth value has been performed.

According to the above configuration example, a direction input in which the displacement amount is large to some extent is required, and thus, the first swinging action not intended by the user can be prevented from being performed.

As another configuration example, the first input direction and the second input direction may be directions that are opposite to each other with respect to the origin.

According to the above configuration example, an input in a direction opposite to the direction in which the item object is held during posturing is required. Therefore, an intuitive and easily recognizable swing operation can be provided to the user.

In another configuration example, in a state where no input is performed on the operation device by a user, the displacement amount may become not greater than a predetermined value, or the displacement amount may be gradually reduced so as to be not greater than the predetermined value after a lapse of a predetermined time.

According to the above configuration example, for example, simply by releasing the finger from the operation device, the displacement amount can be caused to return to a value corresponding to the origin. Thus, operability can be enhanced.

As another configuration example, the operation device may include a stick device and output input direction data corresponding to a tilt of the stick device.

According to the above configuration example, when the posturing action, the first swinging action, or the second swinging action is performed, more intuitive and easily recognizable operability can be provided to the user.

As another configuration example, in a case where a positional relationship between coordinates indicated by temporally-consecutive two pieces of input data acquired from the operation device is a positional relationship in which an origin region whose center is the origin is between the coordinates, the instructions may further cause the processor to determine that an input onto the origin region has been performed.

According to the above configuration example, even in a case where the input trajectory is a trajectory that passes the origin and the detection timing of the input and the timing when the input position is at the origin do not coincide with each other, it is possible to consider that an input to the center has been provided. Accordingly, determination of the presence of the input at the origin can be more quickly detected.

As another configuration example, in a case where an angle difference between the going-way input direction and the return-way input direction is in a predetermined range, the instructions may cause the processor to cause the player object to perform the second swinging action.

According to the above configuration example, in a case of a trajectory in which the going way and the return way substantially overlap with each other, the second swinging action can be caused to be performed. Accordingly, with respect to the relationship between the item object swinging direction and the direction input performed by the user, strangeness can be prevented from being given to the user.

As another configuration example, the instructions may cause the processor to cause the player object to perform the second swinging action, on the basis of a fact that the going-way direction input in which, after the state of the displacement amount being not greater than the first value has continued for not less than a predetermined time, the displacement amount increases to exceed the first value, and then, further the return-way direction input in which the displacement amount decreases to be not greater than the second value have been performed within the first time.

According to the above configuration example, for example, it is possible to cause the second swinging action to be performed only after the input position stays at the origin for a certain period. Accordingly, for example, when random direction inputs have consecutively been performed, the second swinging action not intended by the user can be prevented from being performed.

As another configuration example, the instructions may cause the processor to cause the player object to perform the second swinging action, further on a condition that a total distance of trajectories of input coordinates in an immediately preceding predetermined time is not greater than a certain value.

According to the above configuration example, for example, when random direction inputs have consecutively been performed in a predetermined time, the total distance of the trajectories is considered to be long to some extent or longer. Therefore, when the total distance being not greater than a certain value is used as an execution condition for the second swinging action, occurrence of the second swinging action not intended by the user can be prevented.

As another configuration example, the instructions may further cause the processor to cause the player object to perform a third swinging action of swinging the item object, in accordance with cancelation of the first direction input.

According to the above configuration example, with respect to the operation of causing the player object to swing the item object, a variety of operations can be provided to the user.

As another configuration example, in a case where the player object is performing the posturing action in a state of the displacement amount being not less than a sixth value, when the second direction input in which the displacement amount in a state of being not less than the sixth value enters a state of being less than the sixth value, and then enters a state of being not less than a seventh value, and after the second direction input, a third direction input in which the displacement amount enters a state of being less than the seventh value and then returns to the state of being not less than the sixth value have been performed within a predetermined time on the operation device, the instructions may further cause the processor to cause the player object to perform a fourth swinging action of swinging the item object by rotating about an axis orthogonal to a direction according to the second or third direction inputs.

According to the above configuration example, with respect to the operation of causing the player object to swing the item object, a variety of operations can be provided to the user.

As another configuration example, the operation device may further include an inertial sensor. The instructions may further cause the processor to: in a first operation mode, cause the player object to perform the posturing action and the first swinging action on the basis of the first direction input; and in a second operation mode, cause the player object to perform the posturing action on the basis of an orientation of the operation device, and cause the player object to perform the swinging action on the basis of a swing input performed on the operation device.

According to the above configuration example, with respect to a series of actions of taking a posture of holding the item object and swinging the item object, a further variety of operations can be provided to the player.

As another configuration example, the item object may be a weapon object for attacking an enemy object by the swinging action.

According to the above configuration example, with respect to the operation of swinging a weapon in order to attack an enemy, a simple and intuitive operation method can be provided to the player.

According to the exemplary embodiment, with respect to the operation of causing the player object to swing the item object, a variety of operations can be provided to the user.

BRIEF DESCRIPTION OF THE DRAWINGS

FIG. 14 shows a non-limiting example of the posturing action;

FIG. 15 shows a non-limiting example of the posturing action;

DETAILED DESCRIPTION OF NON-LIMITING EXAMPLE EMBODIMENTS

Hereinafter, the exemplary embodiment will be described.

A game system according to an example of the exemplary embodiment is described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
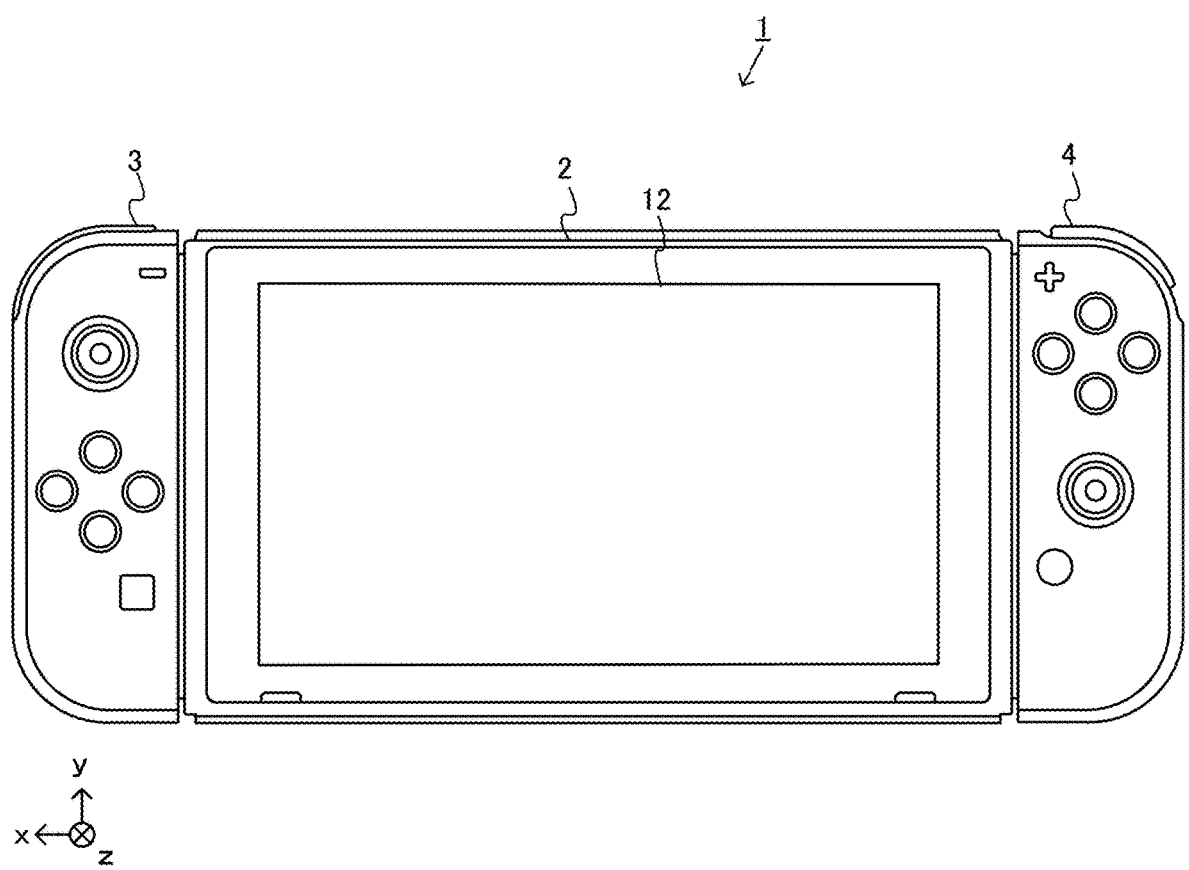
FIG. 1 shows a non-limiting example of the state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
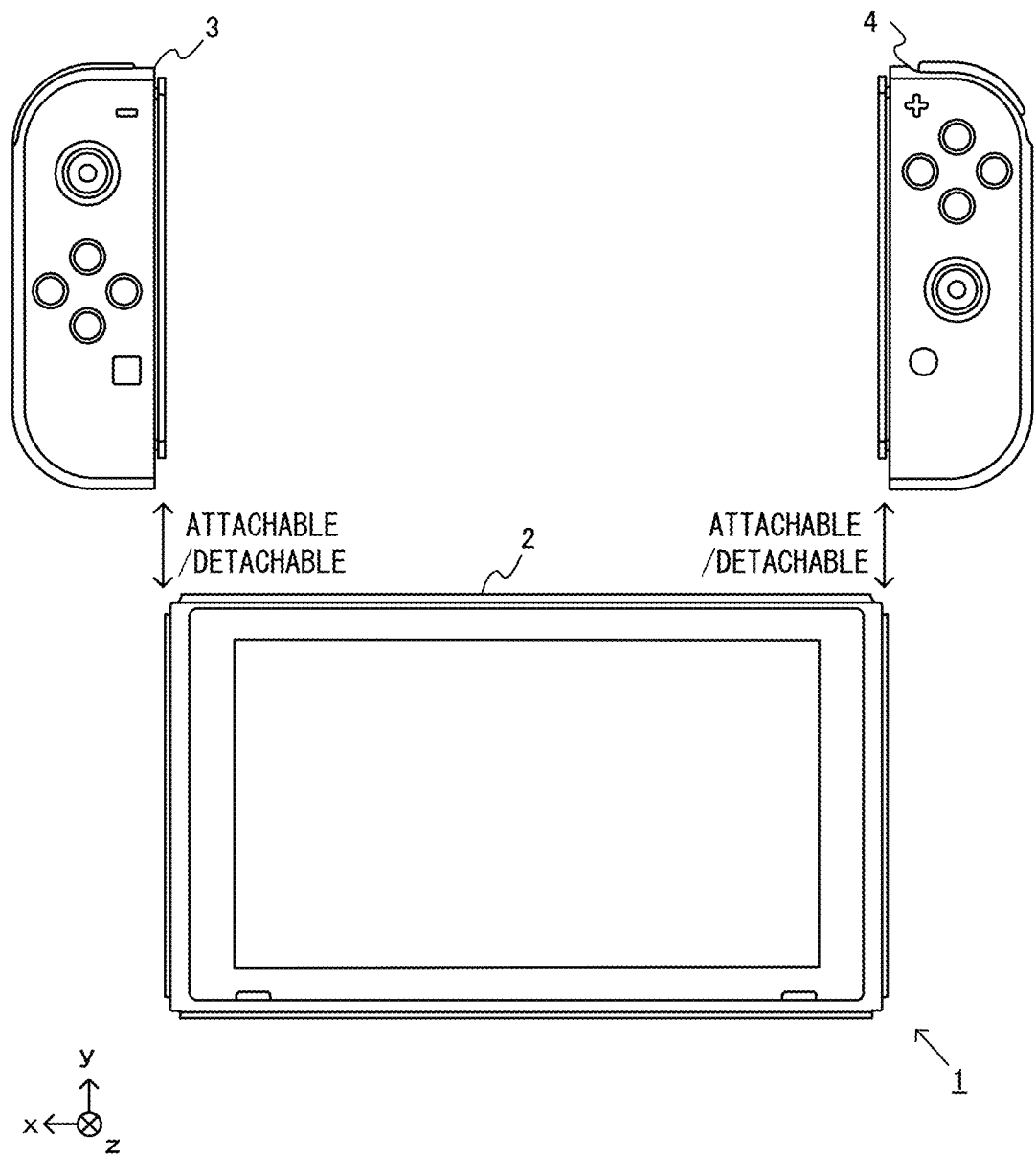
FIG. 2 shows a non-limiting example of the state where the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
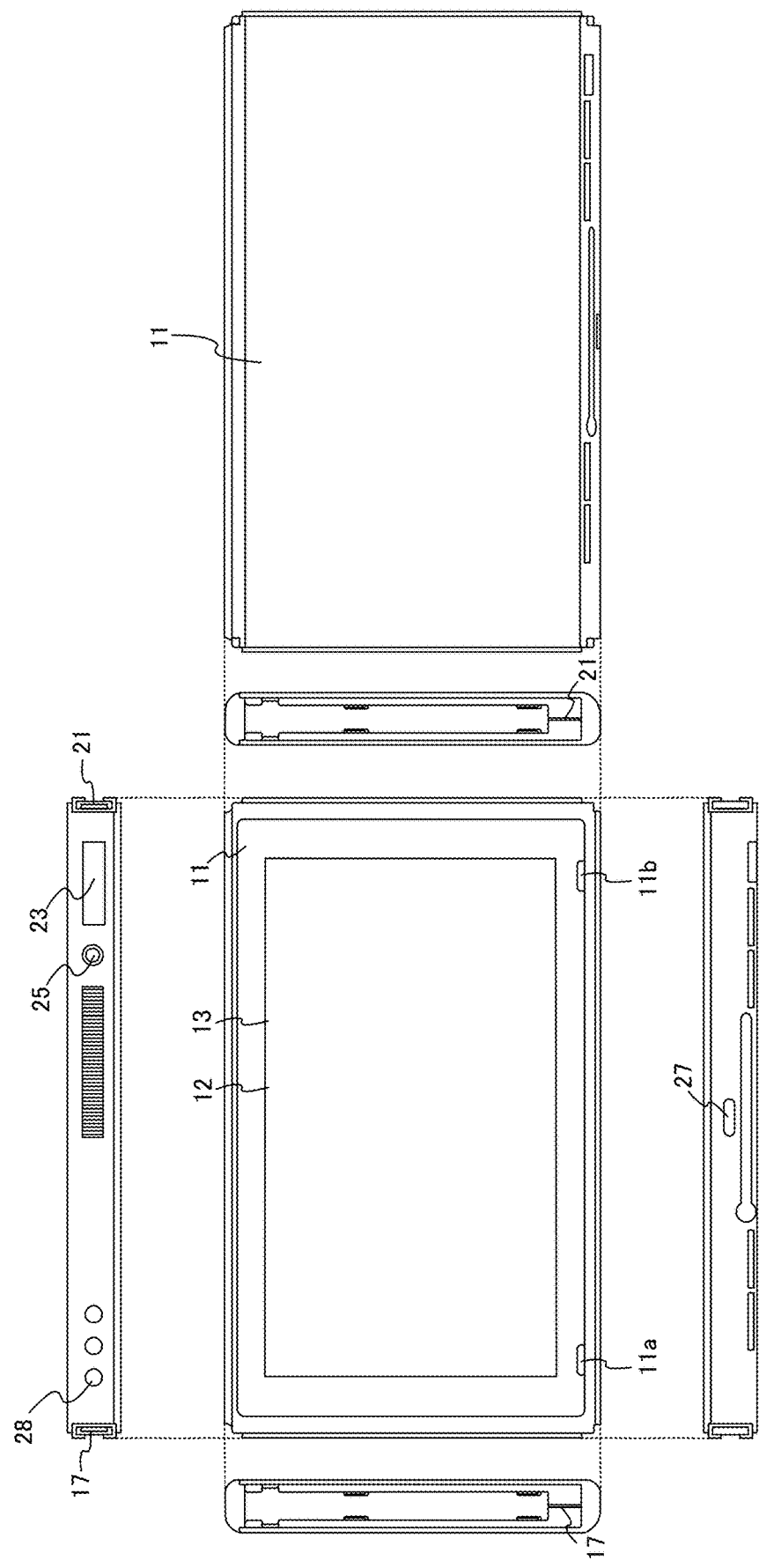
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

It should be noted that the shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
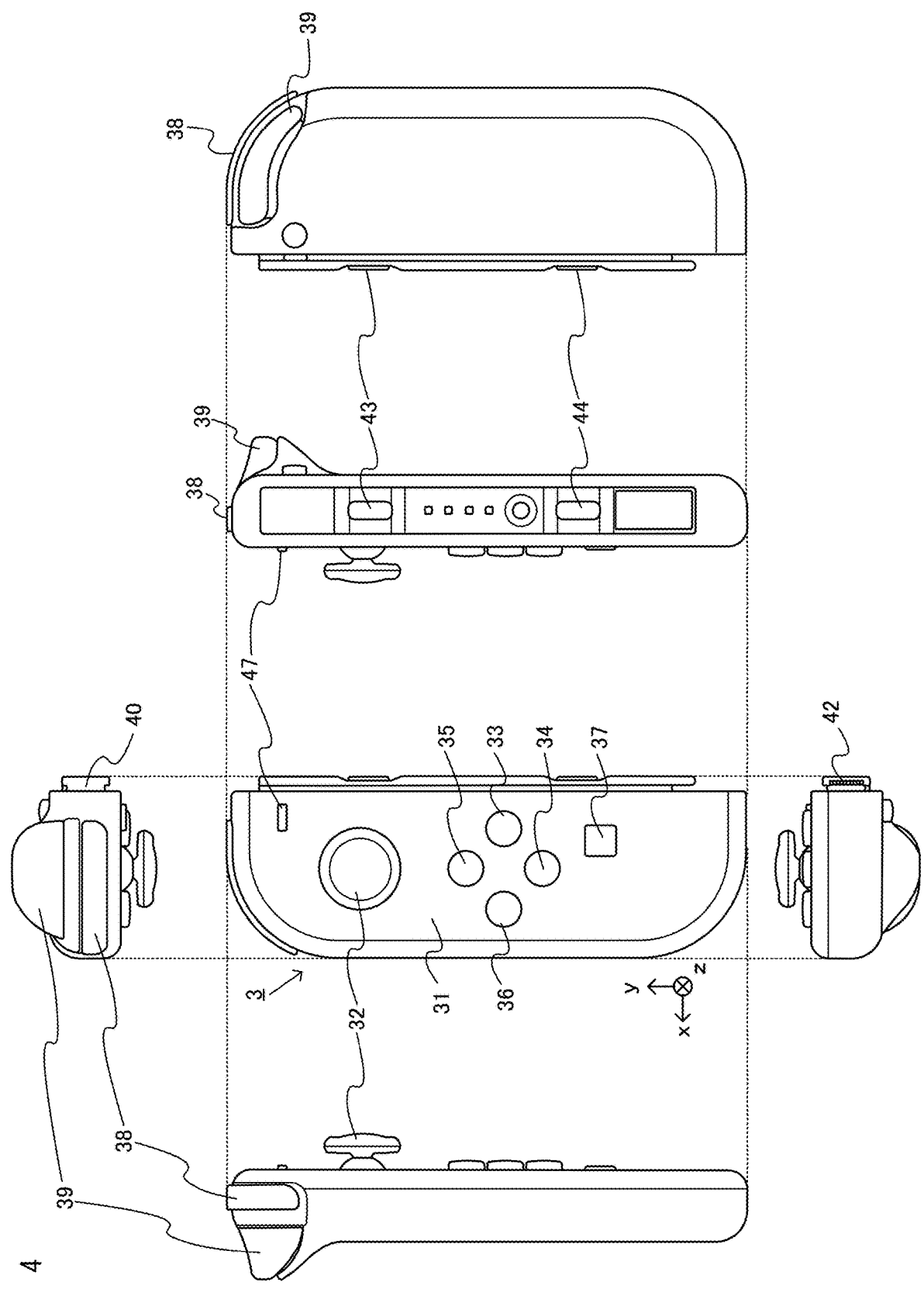
FIG. 4 is six orthogonal view showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). When the user releases the finger from the left stick 32 in a state where the left stick 32 is tilted, the left stick 32 returns to a neutral position by a return mechanism (e.g., a spring) (not shown). In the exemplary embodiment, the motion of this return is an instantaneously returning motion. However, in another exemplary embodiment, the displacement amount of the input may be gradually reduced such that the left stick 32 returns to the neutral position after an elapse of a predetermined time. It should be noted that the left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
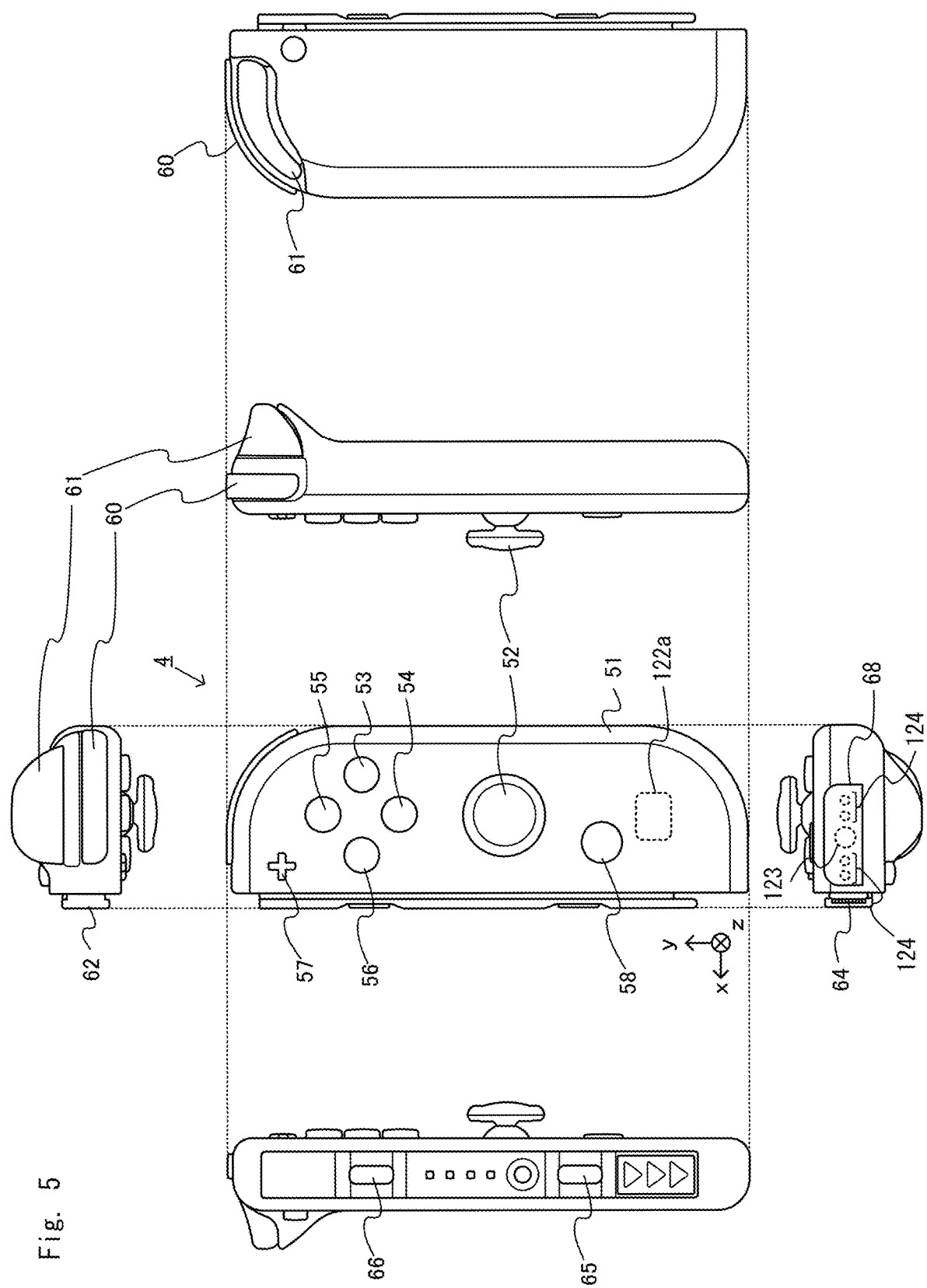
FIG. 5 is six orthogonal view showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
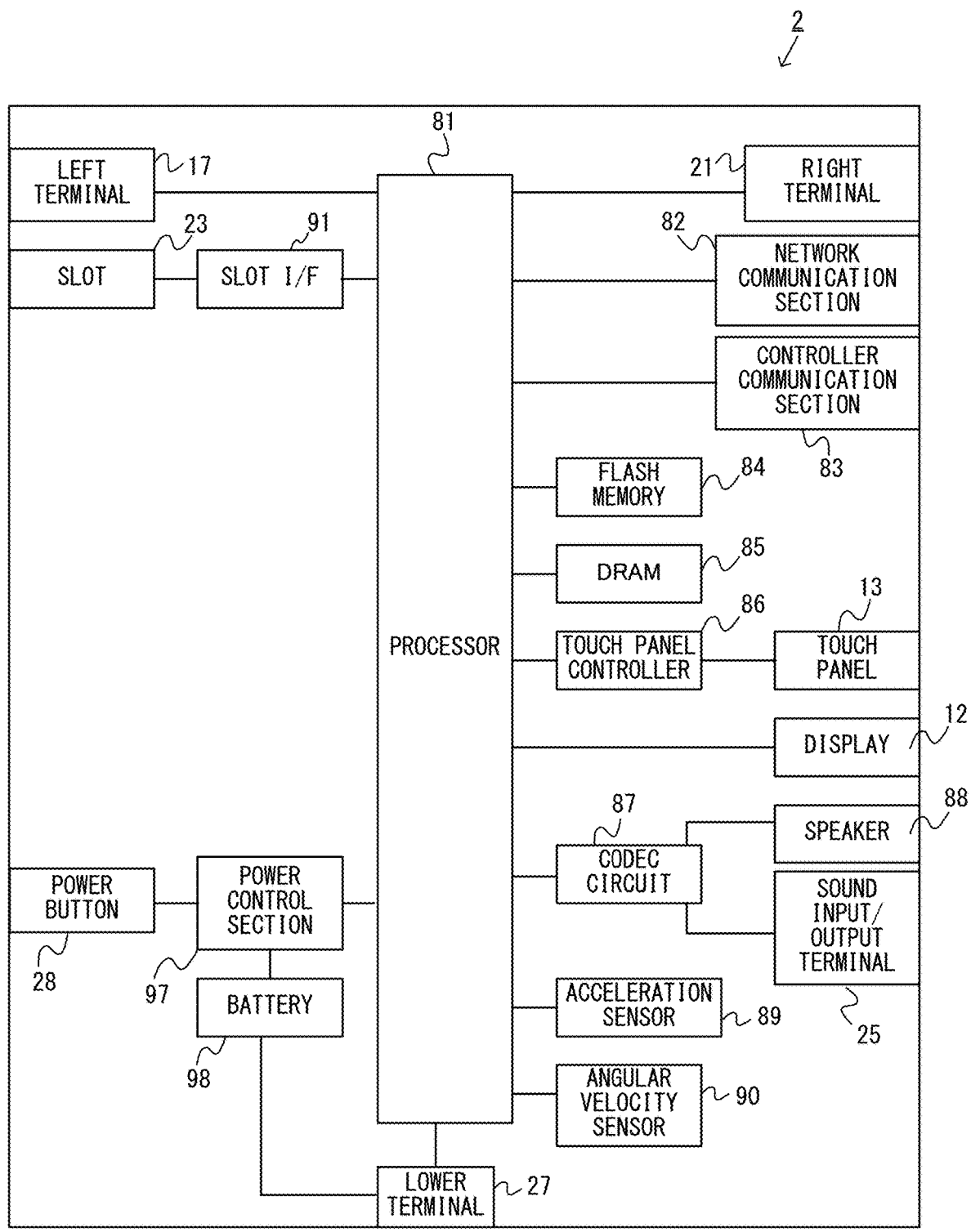
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
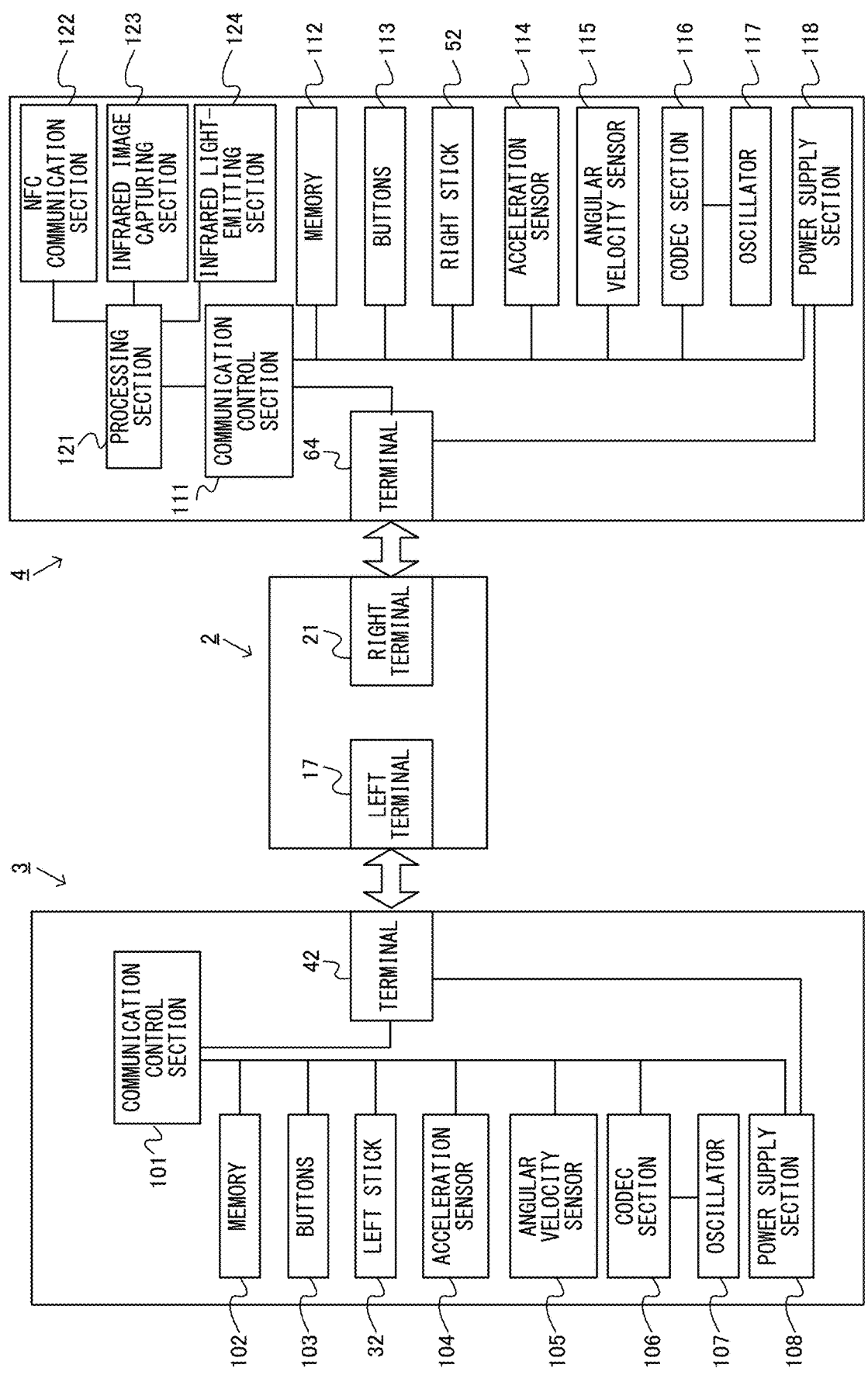
FIG. 7 is a block diagram showing a non-limiting example of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing of Exemplary Embodiment]

Next, the outline of operation of game processing executed by the game system 1 according to the exemplary embodiment will be described. In the above game system 1, the left controller 3 and the right controller 4 are attachable to and detachable from the main body apparatus 2. When a game is played in the state where the left controller 3 and the right controller 4 are attached to the main body apparatus 2, the game image is outputted to the display 12. When the main body apparatus 2 alone in the state where the left controller 3 and the right controller 4 are detached from the main body apparatus 2 is attached to the cradle, the main body apparatus 2 can also output the game image to a stationary monitor or the like via the cradle. In the exemplary embodiment, description is given of an example case where the game is played in the latter form, i.e., in the form in which the main body apparatus 2 alone in the state where the left controller 3 and the right controller 4 are detached from the main body apparatus 2 is attached to the cradle and the main body apparatus 2 outputs the game image and the like to the stationary monitor or the like via the cradle.

Figure 8:
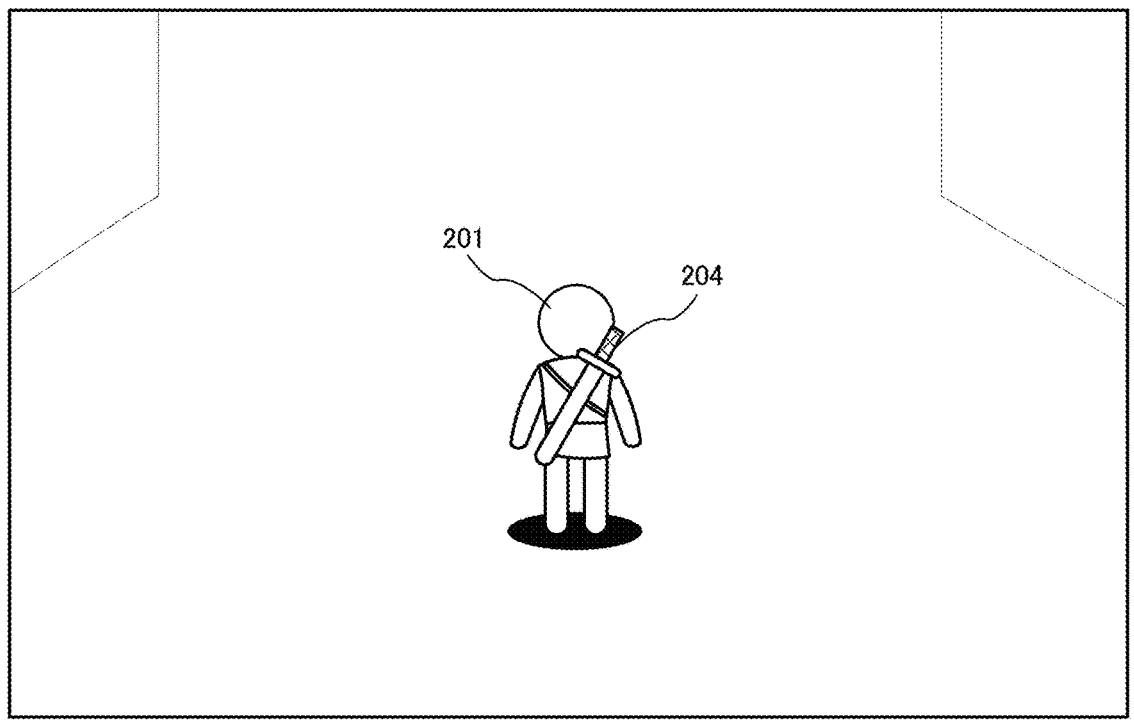
FIG. 8 is a non-limiting example of a game screen according to an exemplary embodiment.
Figure 9:
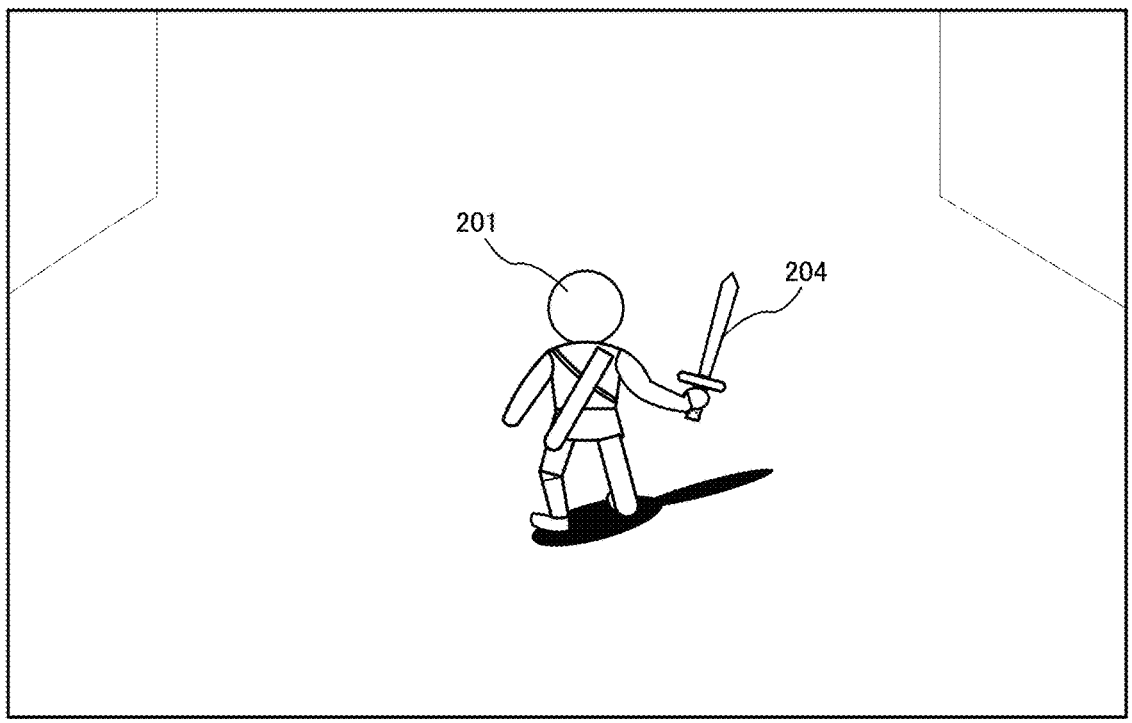
FIG. 9 shows a non-limiting example of the game screen according to the exemplary embodiment.

The game (hereinafter, referred to as "this game") assumed in the exemplary embodiment is an action adventure game in which a player object is operated in a virtual three-dimensional space. FIG. 8 is an example of a game screen assumed in the exemplary embodiment. In FIG. 8, how the three-dimensional virtual game space is seen is shown on the game screen. In the three-dimensional virtual game space, a player object 201 is present and an image seen from behind and captured by a virtual camera is displayed. The entire body of the player object 201 is displayed on the game screen. Further, the player object 201 carries a sword 204 (hereinafter, simply referred to as a sword) on the back. The sword 204 is in a state of being in a sheath, and the sword 204 can be drawn from the sheath through an operation described later. Hereinafter, drawing the sword 204 from the sheath will be referred to as "sword drawing". FIG. 9 shows an example of the screen regarding the player object 201 after sword drawing has been performed. FIG. 9 shows a state where the sword 204 is gripped with the right hand of the player object 201. In this state, the player can move the sword 204 within a range based on the movable range of the right arm of the player object 201.

In this game, the player object 201 can be caused to perform a movement of "swinging" the sword 204. Thus, the player object 201 can attack a predetermined enemy object (not shown) by swinging the sword 204. Further, the player object 201 can also "slash" a predetermined object other than an enemy, such as a plant object. The processing according to the exemplary embodiment is processing regarding an operation for causing the player object 201 to perform a movement of "swinging" the sword 204. In the description below, the movement of "swinging" the sword 204 will be referred to as a "sword swinging movement". The sword swinging movement includes two actions, i.e., a "posturing action" and a "swinging action" described later.

Figure 10:
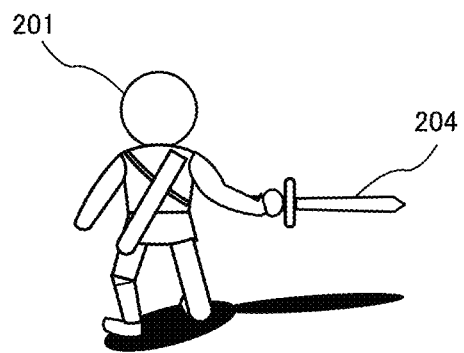
FIG. 10 shows a non-limiting example of a player object taking a posture of holding a sword.
Figure 11:
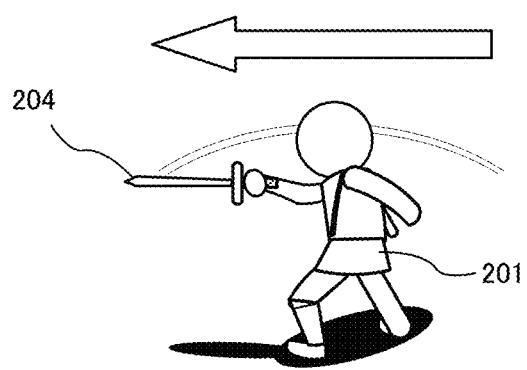
FIG. 11 shows a non-limiting example of a swinging action.

Next, before describing specific operation contents, the "state (in the game)" of the player object 201 related to the movement of "swinging" as described above, and the transition thereof will be described. Hereinafter, the state in the game of the player object 201 will be referred to as a "PO state (player object state)". First, in this game, the PO state where the sword 204 is in the sheath as shown in FIG. 8 is referred to as a "non-sword-drawn state". In this state, when a predetermined sword drawing operation is performed, a sword drawing motion is displayed, and then, as shown in FIG. 9, the player object 201 enters a state where the player object 201 has the sword 204 with the right hand. In the exemplary embodiment, this PO state is referred to as a "posturing state". In the posturing state, the player can cause the player object 201 to perform a posturing action. The posturing action is an action of changing the position and orientation of the sword 204 in the movable range of the right arm of the player object 201. That is, the posturing action is such an action in which the player object 201 takes a posture of holding the sword before swinging the sword. FIG. 10 shows an example in which the player object 201 takes a posture of holding the sword 204 with the tip thereof directed toward the right direction. In the posturing state, the orientation of the sword 204 can be changed by an operation described later. Then, in the posturing state, when a predetermined condition has been satisfied (i.e., when a predetermined operation has been performed), a motion of actually swinging the sword 204 is displayed. Hereinafter, the PO state in the middle of swinging the sword 204 will be referred to as a "swinging state". Further, the motion of swinging the sword will be referred to as a "swinging action". FIG. 11 shows an example of the player object 201 in the "swinging state". In the example in FIG. 11, a swinging action of horizontal slashing from the right direction toward the left direction is shown.

[Operation Mode]

Next, specific operations for causing the movement as described above are described. In the exemplary embodiment, two operation modes are provided for causing the movements as described above to be performed. A first operation mode is an operation mode that mainly uses the right stick 52 provided to the right controller 4. A second operation mode is an operation mode that uses inertial sensors of the right controller 4. It should be noted that, in the exemplary embodiment, either one of these operation modes is set. For example, on a game setting screen, an item for setting an operation mode is provided, and either one of the operation modes is designated. Therefore, when the first operation mode is set, operation according to the second operation mode cannot be performed. The same applies vice versa.

[Second Operation Mode]

Next, each operation mode will be described. For convenience of description, the second operation mode is described first. A described above, the second operation mode uses inertial sensors of the right controller 4. Specifically, in the second operation mode, the player regards the right controller 4 as the sword 204, and can change the orientation of or swing the sword 204 by tilting or swinging the right controller 4.

In an example of the operation, first, in the non-sword-drawn state, when the player presses a predetermined button, the player object 201 performs sword drawing and the PO state transitions to the posturing state. At this time, on the basis of outputs from the inertial sensors, the orientation of the right controller 4 is calculated, and the orientation is reflected in the orientation of the sword 204. For example, the inertial sensors include a gyro sensor, and the orientation of the right controller 4 is calculated on the basis of the angular velocity detected by the gyro sensor. Here, a case where the orientation as shown in FIG. 9 has been established as a result of a sword drawing operation is assumed. Next, it is assumed that, when the screen is in the state as shown in FIG. 9, the player has horizontally stretched the right arm and the right controller 4 has also taken a substantially horizontal orientation. In this case, the orientation of the right controller 4 is calculated on the basis of outputs from the inertial sensors, and this orientation is reflected in the position and orientation of the sword 204. As a result, the position and orientation of the sword 204 (and the player object 201) are changed to those as shown in FIG. 10.

Further, it is assumed that, when the game screen is in the state as shown in FIG. 10, the player swings the right controller 4 in the left direction at not less than a predetermined speed. In this case, a motion of swinging the controller is detected on the basis of outputs from the inertial sensor. For example, the inertial sensors include an acceleration sensor, and it is determined that the controller has been swung, on the basis of determination that an acceleration having not less than a predetermined value has been detected. As a result, the PO state transitions to the swinging state, and change in the orientation of the right controller 4 in this swinging motion is reflected in change in the position and orientation of the sword 204. As a result, the player object 201 performs the swinging action as shown in FIG. 11.

As described above, in the second operation mode, on the basis of outputs of the inertial sensors, the orientation of the right controller 4 is calculated, and swinging is determined. Then, the calculated orientation of the right controller 4 is reflected in the sword 204, whereby a series of actions comprising the above-described posturing action and swinging action are realized. Accordingly, the sword 204 can be swung by moving the right controller 4 itself, and thus, an intuitive operation can be performed. In addition, a user experience as if the user was actually swinging the sword can be provided.

[First Operation Mode]

As described above, in the second operation mode, the inertial sensors are used, whereby an operation method of moving the right controller 4 itself is provided. Here, in the game system 1 according to the exemplary embodiment, as described above, the left controller 3 and the right controller 4 are attachable to and detachable from the main body apparatus 2. Therefore, there are also cases where the game screen is displayed on the display 12 when the game is played in the state where the left controller 3 and the right controller 4 are attached to the main body apparatus 2 as shown in FIG. 1. In such a case, it is considered that the operations using the inertial sensors of the right controller 4 are difficult to be performed. In addition, there may be a case where the player does not like in the first place the operation method such as the second operation mode. Therefore, the first operation mode is provided in the exemplary embodiment. In this operation mode, it is possible to perform a series of actions comprising the posturing action and the swinging action, as in the case of the second operation mode, through a simple direction input operation using the right stick 52. Therefore, even in the state where the left controller 3 and the right controller 4 are attached to the main body apparatus 2, it is possible to cause the player object 201 to perform movement of swinging the sword 204, as in the case of the second operation mode. Alternatively, even in a case where the player does not use (or does not want to use) the second operation mode although the main body apparatus 2 is in the state of not having the controllers attached thereto, it is possible to cause the player object 201 to perform movement of swinging the sword 204.

Next, the outline of operations and processing in the first operation mode is described. First, handling of operation input data of the right stick 52 is described. In the first operation mode, operation input data from the right stick 52 is obtained as a two-dimensional value. That is, it is assumed that operation input data from the right stick 52 is obtained as a two-dimensional value of (x, y). Then, in the exemplary embodiment, a two-dimensional plane (hereinafter, stick plane) of a coordinate system in which, with the right stick 52 viewed from immediately above, the right direction is the x-axis positive direction and the up direction is the y-axis positive direction, is assumed. In this stick plane, the position (origin) when the right stick 52 is in a neutral state (the state where the right stick 52 is not tilted in any direction) is assumed to be the center of the stick plane. Further, in the exemplary embodiment, the range of the each value of the above (x, y) is assumed to be a range of −1 to +1 with respect to 0, which is the center of the stick plane (the left and down directions are negative directions, and the right and up directions are positive directions). In this case, the vector (hereinafter, referred to as an input vector) connecting this origin and the coordinate represented by the above-described two-dimensional value indicates the input strength and the input direction. That is, the length of the input vector indicates the degree of tilt of the right stick 52, and the orientation of the input vector indicates the input direction.

Figure 12:
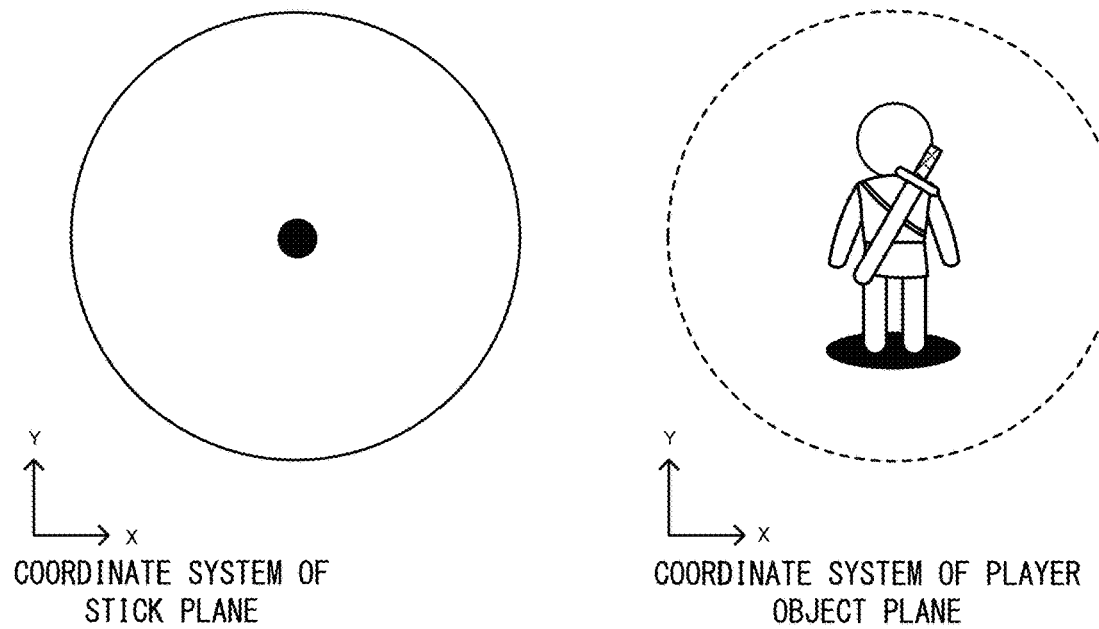
FIG. 12 shows a non-limiting example of a posturing action.

Next, the relationship between the input content of the right stick 52 and the posturing action and swinging action is described. In the exemplary embodiment, the stick plane is associated with an x-y plane that is defined with the player object 201 seen from behind. FIG. 12 shows the correspondence between the stick plane and the x-y plane (hereinafter, referred to as a player object plane). In FIG. 12, a circular stick plane is shown on the left side. Further, in FIG. 12, the player object 201 is shown on the right, and the player object plane is indicated by a dotted line surrounding the player object 201. It should be noted that the outer circumference of the circle of the stick plane indicates the input limit (where the right stick 52 is tilted to the maximum) of the right stick 52. In other words, the stick plane indicates the movable range of the stick. In FIG. 12, a plane in which the player object 201 is seen from behind is assumed, and correspondence in which a substantial center portion of the player object 201 matches the center of the stick plane is assumed. It should be noted that, in another example, a root portion of the right arm and the center of the stick plane may be associated with each other.

On the assumption of the above correspondence relationship, the following operation can be performed in the first operation mode. First, it is assumed that the operation of the sword drawing is the same as that in the second operation mode described above. When sword drawing has been performed, a predetermined sword drawing motion is displayed, and then, the PO state transitions to the posturing state. In this posturing state, the orientation of the sword 204 can be changed in accordance with an input of the right stick 52. In the case where the input of the right stick 52 is neutral, a predetermined orientation corresponding thereto is taken.

Figure 13:
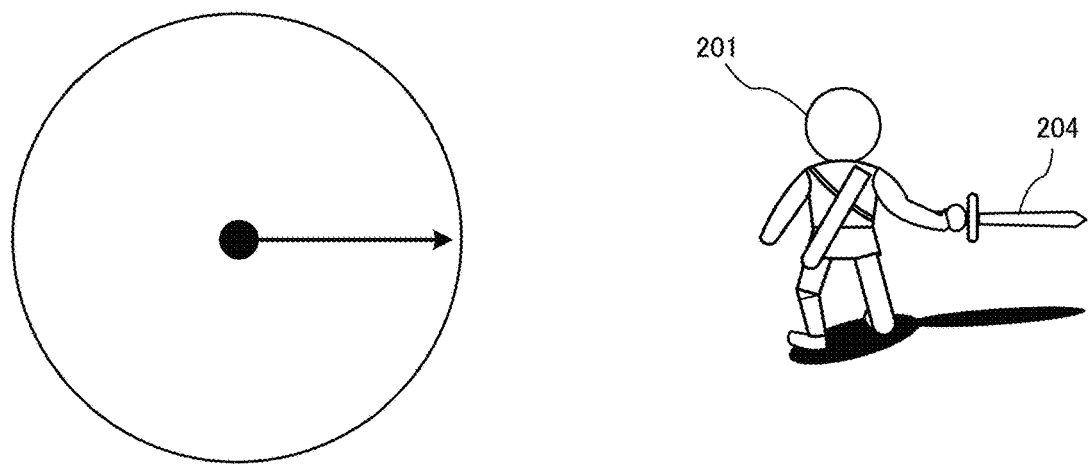
FIG. 13 shows a non-limiting example of the posturing action.

Next, an example of movement (orientation change) of the sword 204 (other than that in the swinging action) in the posturing state is described. FIG. 13 shows an example of a case where the right stick 52 has been tilted to the maximum in the right direction. In FIG. 13, the stick plane and the input vector thereof (arrow) are shown on the left side, and the orientation of the sword 204 (and the player object 201) corresponding to this input is shown on the right side. As shown in FIG. 13, when the right stick 52 has been tilted to the maximum in the right direction, the orientation of the sword 204 is also changed, in accordance with this, to an orientation in which the tip of the sword 204 is directed to the right. It should be noted that the position in the depth direction (on the z axis) may be any position corresponding to the game content, but basically, is a position that is influenced by the movable range of the right arm of the player object 201 having the sword 204.

Figure 16:
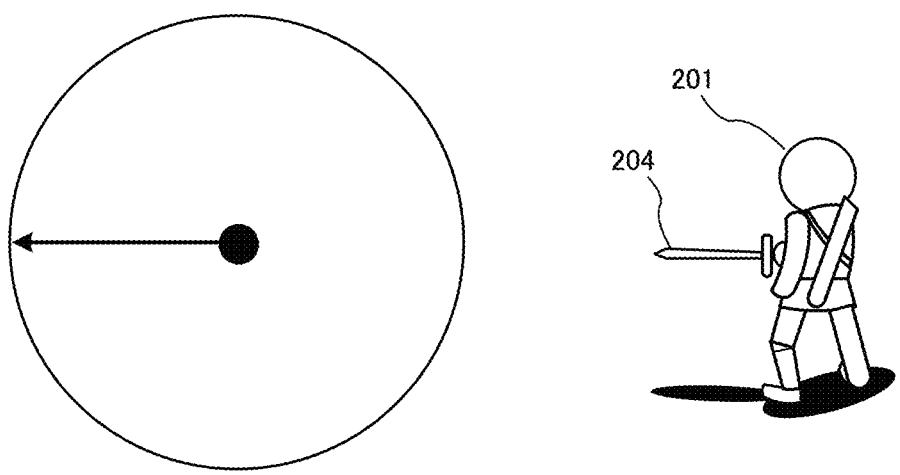
FIG. 16 shows a non-limiting example of the posturing action.
Figure 17:
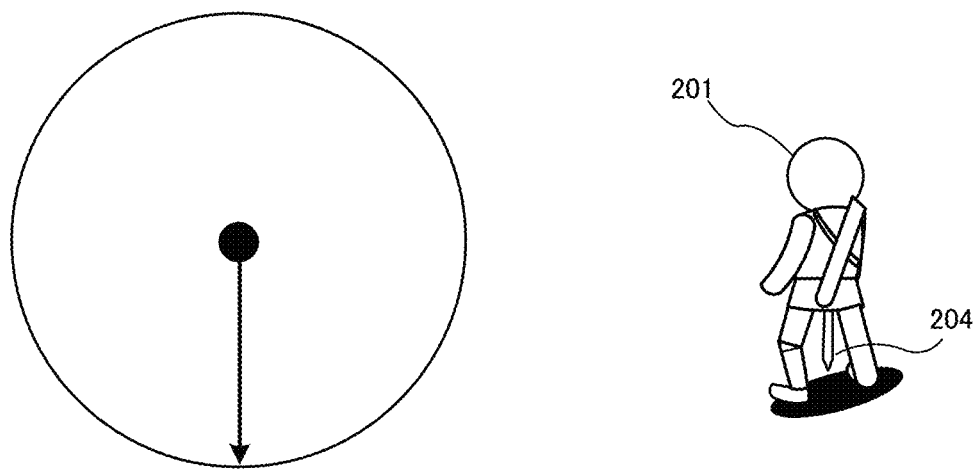
FIG. 17 shows a non-limiting example of the posturing action.

A case in which, from the orientation shown in FIG. 13, only the input direction of the right stick 52 is further rotated counter-clockwise while the right stick 52 is tilted to the maximum, is assumed. FIGS. 14 to 17 show examples of changes in the orientation in this case. FIG. 14 shows a case where the input direction of the right stick 52 is an upper right direction. In this case, the tip of the sword 204 is also in an orientation directed to the upper right direction on the player object plane. Further, when the input direction of the right stick 52 is changed to the straight up direction, the orientation of the tip of the sword 204 is changed to an orientation directed to the straight up direction in the player object plane, as shown in FIG. 15. Further, when the input direction of the right stick 52 is changed to the left direction, the tip of the sword 204 is changed to an orientation directed to the left direction in the player object plane, as shown in FIG. 16. Further, when the input direction of the right stick 52 is changed to the straight down direction, the orientation of the tip of the sword 204 is changed to an orientation directed to the straight down direction in the player object plane, as shown in FIG. 17.

In this manner, in the first operation mode, in the posturing state, the posturing action can be performed by an input operation of the right stick 52. That is, the orientation of the sword 204 can be changed such that (the tip of) the sword 204 is directed to a direction corresponding to the direction input of the right stick 52.

Next, the swinging action in the first operation mode is described. In the posturing state, when an operation satisfying a predetermined condition is performed, the player object 201 can be caused to perform the swinging action. In the exemplary embodiment, as the operation for causing the swinging action to be performed, the following three types of operation methods are provided.

(1) Sword swinging movement by "flicking operation".
(2) Sword swinging movement by an input operation (hereinafter, opposite-direction input operation) in which, from a state where the right stick 52 is tilted to the maximum up to the end in a predetermined direction, the right stick 52 is tilted to the maximum in the direction opposite to the predetermined direction within a predetermined time.
(3) Sword swinging movement by "release operation".
Hereinafter, the outline of each operation method is described.

<Outline of Flicking Operation>

Figure 18:
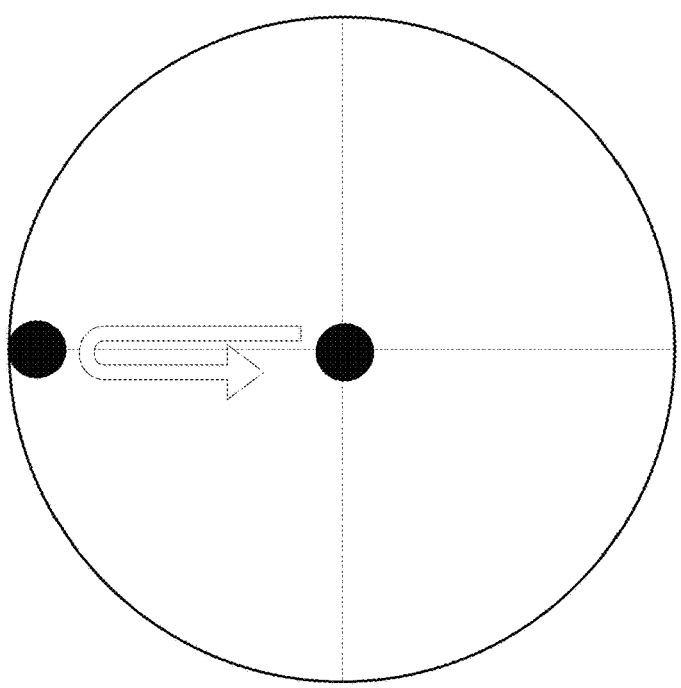
FIG. 18 illustrates a non-limiting example of a flicking operation.

First, the flicking operation in the exemplary embodiment is assumed to be an operation of flicking the right stick 52. That is, when the input trajectory of the right stick 52 is a trajectory that has changed as "center→end→center" as shown in FIG. 18 within several frames, it is determined that the flicking operation has been performed. The example in FIG. 18 is an operation example of flicking the right stick 52 in the left direction. Here, the trajectory of the flicking operation can be regarded as a going and return way composed of a going way directed from the center to the outer side (end of the stick plane) and a return way returning from the outer side toward the center. As for the going way, it is also possible to say that the input is an input in the going-way direction that causes the state (the state where the right stick 52 is at the center) where the displacement amount of the right stick 52 from the center of the stick plane is not greater than a first value, to be changed to a state where the displacement amount exceeds at least the first value. As for the return way, it is also possible to say that the input is an input in the return way direction that realizes a state where the displacement amount is not greater than a second value after the input in the going-way direction. Then, when the two direction inputs in the going way and the return way have been performed within a predetermined number of frames, it is possible to determine that the flicking operation has been performed. In the exemplary embodiment, on the basis of an input history of the right stick 52 corresponding to the last several tens of frames, it is determined whether or not a direction input realizing an input trajectory that can be regarded as having been caused by a flicking operation has been performed. It should be noted that, in the exemplary embodiment, the direction (hereinafter, referred to as a "swing direction") in which the sword 204 is swung in the case of the flicking operation is assumed to be the direction (going-way direction) in which the right stick 52 has been flicked. However, in another exemplary embodiment, the return-way direction may be used as the swing direction.

<Outline of Opposite-Direction Input>

Figure 19:
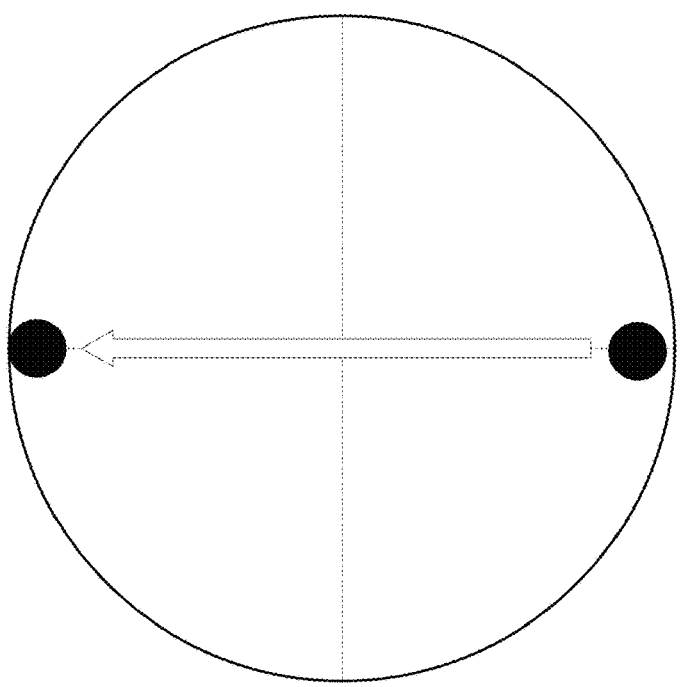
FIG. 19 illustrates a non-limiting example of an opposite-direction input operation.

Next, the outline of the opposite-direction input operation is described. The opposite-direction input operation in the exemplary embodiment is assumed to be an operation in which, from a state (the state where the sword is held in a certain direction during posturing) where the right stick 52 is tilted to the maximum up to the end in a predetermined direction, the right stick 52 is tilted to the maximum up to the end in the opposite direction thereto. For example, assumed is an operation in which, from a state (the state where the right stick 52 is tilted to the maximum up to the right end) where the sword is held in the right direction during posturing, the right stick 52 is tilted to the maximum up to the left end in the direction opposite to the posturing direction within several frames. In this case, the input trajectory of the right stick 52 is determined to have changed as "end in a predetermined direction→end in the opposite direction" in several frames as shown in FIG. 19, whereby it is determined that the opposite-direction input operation has been performed. When the input trajectory is considered in terms of displacement amount, for example, if the displacement amount of the right stick 52 has changed, within several frames, from a displacement amount indicating that the right stick 52 is at an end to a displacement amount indicating that the right stick 52 is at the center, and then, the displacement amount has changed to a displacement amount indicating that the right stick 52 is at an end in the opposite direction, it can be determined that the opposite-direction input operation has been performed. For example, a direction input in which a state where the displacement amount in the right direction from the center of the stick plane is not less than 0.5 has changed to a state where the displacement amount is not greater than 0.5 and then becomes not less than 0.5 in the left direction from the center, has been performed within several frames, it can be determined that the opposite-direction input operation has been performed. It should be noted that the swing direction in the opposite-direction input operation is the "opposite direction" described above.

<Outline of Release Operation>

Figure 20:
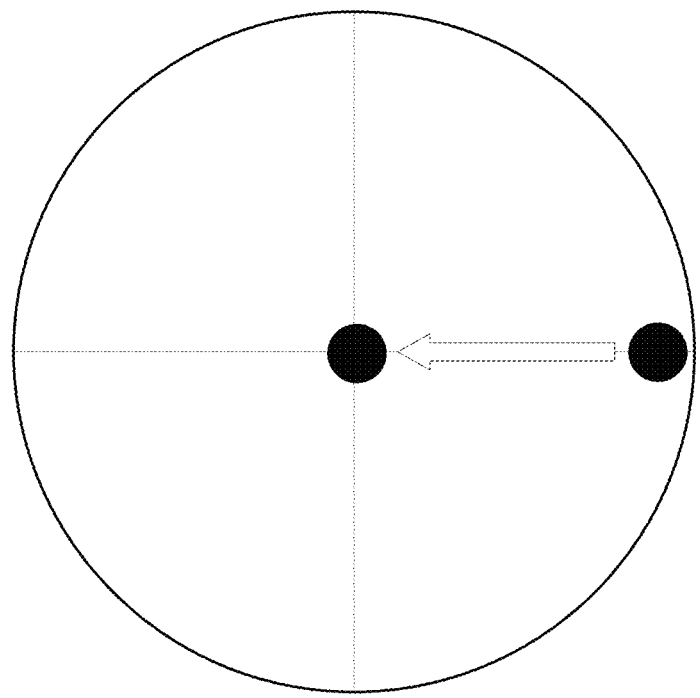
FIG. 20 illustrates a non-limiting example of a release operation.

Next, the outline of the release operation is described. The release operation in the exemplary embodiment is assumed to be an operation in which, in a state where the right stick 52 is tilted to the maximum up to the end in a predetermined direction, the finger is released from the right stick 52 (direction input by the right stick 52 has been canceled). In this case, the right stick 52 returns to the center (origin) of the above stick plane due to the return mechanism provided to the analog stick. Therefore, when the input trajectory of the right stick 52 has been realized as "end→center" within several frames as shown in FIG. 20, it is determined that the release operation has been performed. The example in FIG. 20 shows a case where, in a state where the right stick 52 is tilted to the maximum up to the right end, the finger is released from the right stick 52. It should be noted that the swing direction in this release operation is the direction in which the right stick 52 returns to the center after the release.

<Rotating Slash>

Figure 21:
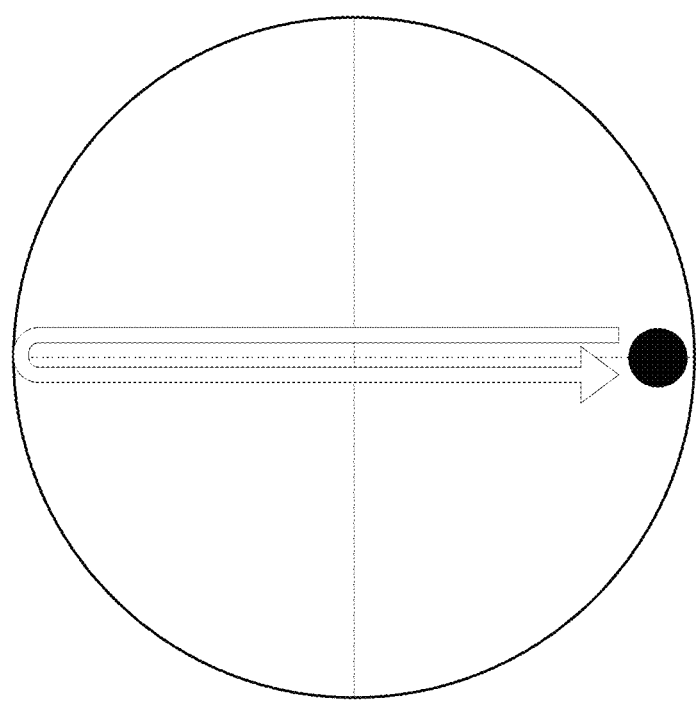
FIG. 21 illustrates a non-limiting example of a rotating slash operation.

In this game, separately from the swinging action described above, it is also possible to cause the player object 201 to perform a movement of "rotating slash" as one of "special actions". In the exemplary embodiment, as a "rotating slash operation" for causing this movement to be performed, when the input trajectory of the right stick 52 has become "outer side→outer side in opposite direction→original position" as shown in FIG. 21 within several frames, it is determined that the rotating slash operation has been performed. When such an operation has been performed, a movement of rotating the sword 204 about the axis orthogonal to the direction, in the game space, that corresponds to the direction (going-way direction or return-way direction), in the stick plane, that is indicated by the input trajectory, is performed. In the example shown in FIG. 21, displacement occurs as "right end→left end→right end", and in the trajectory, the displacement occurs along the horizontal direction in the stick plane. In such an operation, a movement in which the player object 201 swings the sword 204 while rotating about the gravity axis (the axis orthogonal to the horizontal direction) in the virtual game space, is performed. In other words, a rotating slash of rotating the sword 204 in the horizontal direction is performed. Further, for example, in the case of the input trajectory being "upper end→lower end→upper end", a rotating slash of rotating the sword 204 in the vertical direction in the game space is performed.

Figure 22:
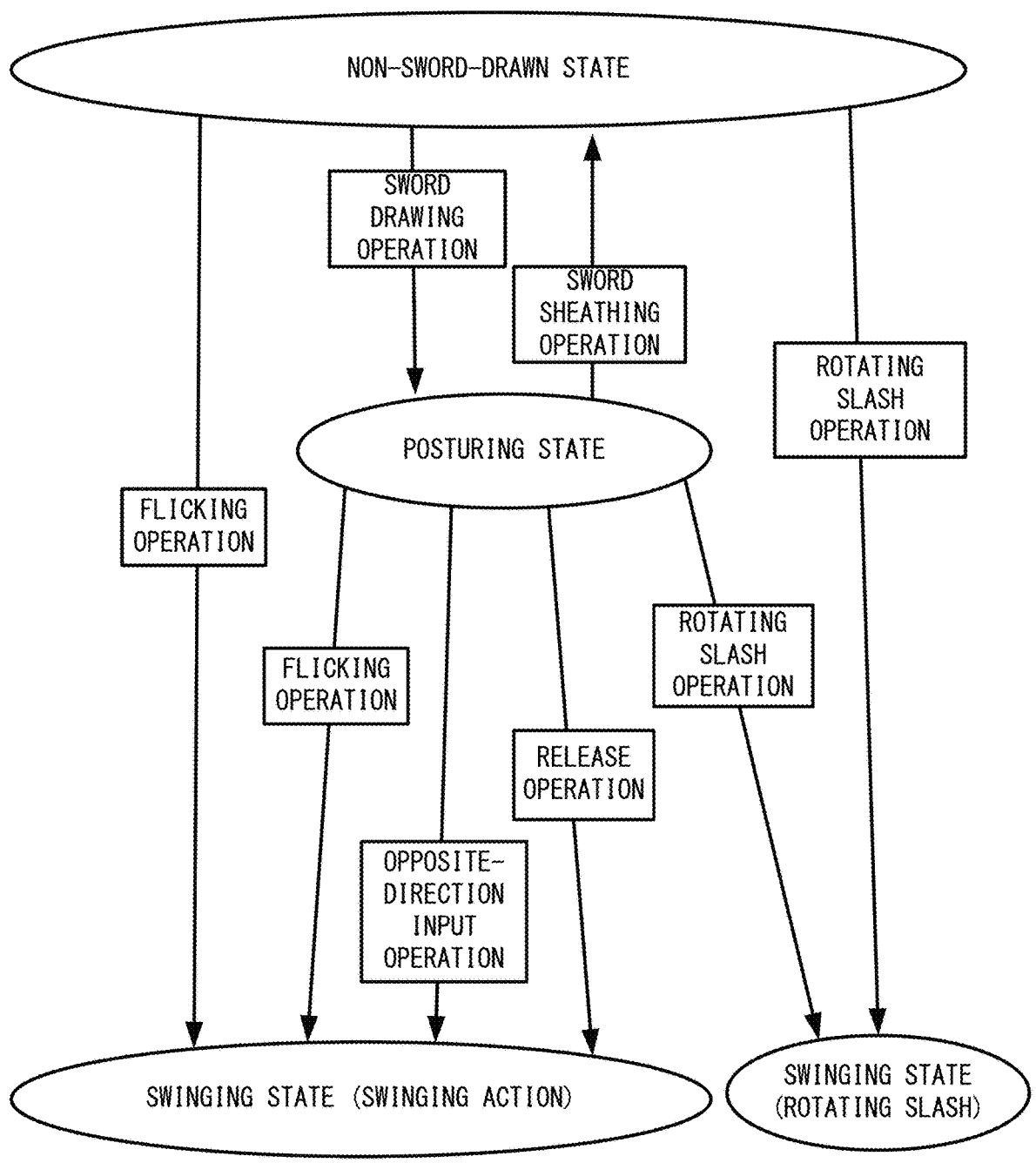
FIG. 22 illustrates a non-limiting example of transition of the state of the player object.

Here, the transition relationship between various operations in the first operation mode as described above and the PO states based on these operations is shown FIG. 22. As shown in FIG. 22, when the "sword drawing operation" is performed in the non-sword-drawn state, the PO state transitions to the above-described posturing state. When the "sword sheathing operation for putting the sword 204 in the sheath is performed in the posturing state, the PO state transitions to the non-sword-drawn state. Further, when any one of the "flicking operation", the "opposite-direction input operation", and the "release operation" as described above is performed in the posturing state, the PO state transitions to a swinging state (the state where the above swinging action is performed). Further, also when the "rotating slash operation" is performed in the posturing state, the PO state transitions to a swinging state. However, the movement performed in this case is a rotating slash movement as a special action, which is different from the above-described swinging action. When the swinging action or the special action ends, the PO state returns from the swinging state to the posturing state.

Further, also when the "flicking operation" as described above has been performed in the non-sword-drawn state, the PO state immediately transitions to a swinging state (the state where the above swinging action is performed). Also when the "rotating slash operation" has been performed in the non-sword-drawn state, the PO state immediately transitions to a swinging state as the rotating slash movement. Further, in the exemplary embodiment, it is assumed that, in a case where the PO state has transitioned from the non-sword-drawn state to a swinging state, when the swinging action or the special action ends, the PO state transitions to the posturing state. However, in another exemplary embodiment, the PO state may return to the non-sword-drawn state in this case.

As described above, in the exemplary embodiment, as for the posturing action and the swinging action, the operation method using the inertial sensors is provided as the second operation mode to the player. Further, as the first operation mode, the posturing action and the swinging action can be performed only by operating the right stick 52. Further, as the operation for causing the swinging action to be performed in the first operation mode, the three types of operation methods as described above are provided. Accordingly, with respect to the action of swinging the sword 204, a variety of operation methods can be provided to the player.

In the exemplary embodiment, with respect to the sword 204 during the above swinging action, hitting determination is set. As for this hitting determination, the same hitting determination is set for each of the above three types of operation methods. That is, using any of the three types of operation methods to swing the sword 204 brings the same result as the game processing result. However, in another exemplary embodiment, separate hitting determinations may be set for the above three types of operation methods.

In this game, in addition to the operations related to the sword 204 as described above, the following operations can also be performed.

[Moving Operation]

In this game, the player object 201 can be moved by using the left stick 32. Therefore, while the player object 201 is moved by the left stick 32, an operation of the sword 204 using the right controller 4 can also be performed. Accordingly, for example, attacking an enemy object while moving can also be performed.

[Virtual Camera Operation]

In this game, the imaging direction of the virtual camera can also be changed by operating the right stick 52 in a state where a predetermined button is pressed. For example, when the right stick 52 is operated while the first R-button 60 is pressed, the orientation of the virtual camera can be changed on the basis of the direction input therefrom. During the operation of the virtual camera, control of the sword 204 by the right stick 52 is not performed. That is, while the first R-button 60 is pressed, the right stick 52 is used for the virtual camera operation, and while the first R-button 60 is not pressed, the right stick 52 is used for controlling the sword 204.

Other than these, various operations related to the progress of the game, such as operations of using various items, can be performed.

[Details of Game Processing of Exemplary Embodiment]

Next, with reference to FIGS. 23 to 27, the game processing in the exemplary embodiment will be described in more detail.

[Data to be Used]

Figure 23:
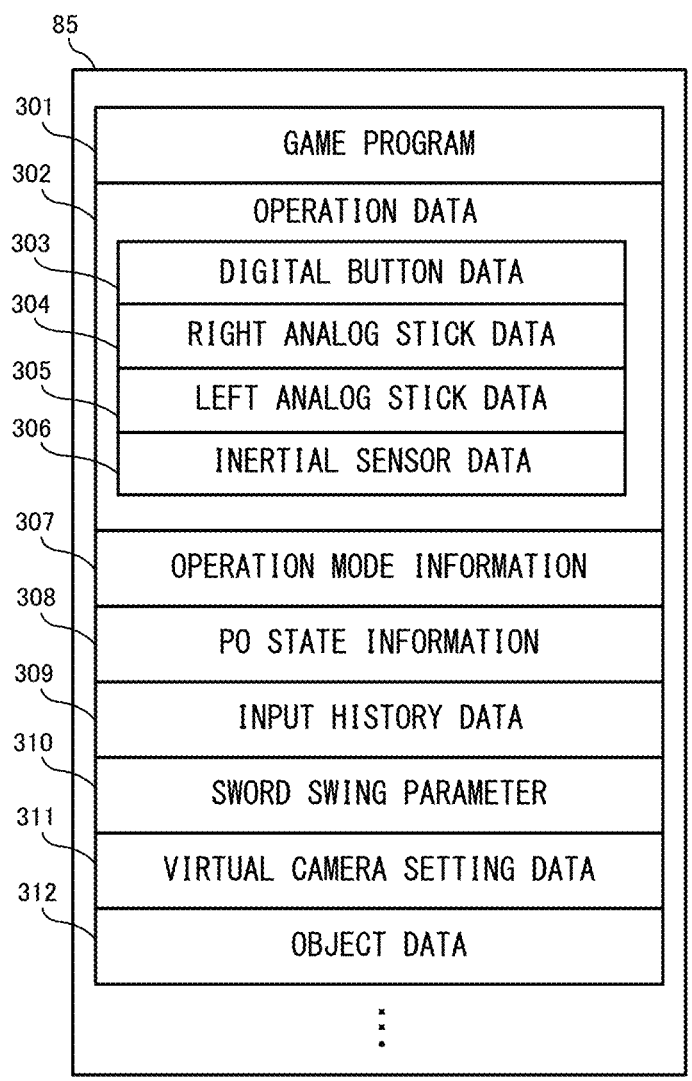
FIG. 23 shows a memory map showing a non-limiting example of various types of data stored in a DRAM 85.

First, various data to be used in this game processing will be described. FIG. 23 is a memory map showing an example of various data stored in the DRAM 85 of the main body apparatus 2. The DRAM 85 of the main body apparatus 2 has stored therein a game program 301, operation data 302, operation mode information 307, PO state information 308, input history data 309, sword swing parameters 310, virtual camera setting data 311, object data 312, and the like.

The game program 301 is a program for executing the game processing according to the exemplary embodiment.

The operation data 302 is data obtained from the left controller 3 and the right controller 4, and is data indicating the content of an operation performed by the player. The operation data 302 includes, at least, digital button data 303, right analog stick data 304, left analog stick data 305, and inertial sensor data 306. The digital button data 303 is data indicating the pressed states of various buttons of the controller. The right analog stick data 304 is data for indicating the content of an operation performed on the right stick 52. Specifically, two-dimensional data of x, y is included. The left analog stick data 305 is data for indicating the content of an operation performed on the left stick 32. The inertial sensor data 306 is data indicating detection results of the inertial sensors such as the above-described acceleration sensor and angular velocity sensor. Specifically, acceleration data and angular velocity data are included.

The operation mode information 307 is information for indicating whether the current operation mode is the first operation mode or the second operation mode.

The PO state information 308 is information for indicating which of the above-described "non-sword-drawn state", "posturing state", and "swinging state" the state of the player object 201 is. The initial value is assumed to be the "non-sword-drawn state".

In the exemplary embodiment, the input history data 309 stores right analog stick data 304 corresponding to the last 20 frames. The data is sequentially replaced from the oldest data. It should be noted that 20 frames are merely an example, and in another exemplary embodiment, the number of frames held as the history may be another value. The input history data 309 is data to be used for determining whether or not the "flicking operation", "opposite-direction input operation", "release operation", or "rotating slash operation" as described above has been performed.

The sword swing parameters 310 are data that defines the content of the motion (more specifically, the motion of the swinging action or the rotating slash) of the player object in the swinging state. Specifically, the sword swing parameters 310 are parameters indicating the moving direction, the moving speed, and the like of the sword 204 and data indicating the content of the movement associated therewith of the player object 201. For example, when the swinging action is performed over 100 frames, the content indicating the moving direction and the moving speed of the sword 204 and the motion of the player object 201 in the 100 frames are set as the sword swing parameters 310.

The virtual camera setting data 311 is data for designating the imaging direction and the like of the virtual camera. In accordance with an operation of the right stick 52 with the first R-button 60 being pressed as described above, the imaging direction is changed.

The object data 312 is data indicating the appearances of various objects that appear in this game, including the player object 201. Model data, texture data, and the like are included in the object data 312.

Other than these, various data that are necessary for the game processing are also generated as appropriate, and are stored in the DRAM 85.

[Details of Processing Executed by the Processor 81]

Next, with reference to the flowchart in FIG. 24, details of the game processing according to the exemplary embodiment will be described. It should be noted that, in the following, processing regarding the operation of the sword 204 as described above is mainly described, and detailed description of the other game processing is omitted.

Figure 24:
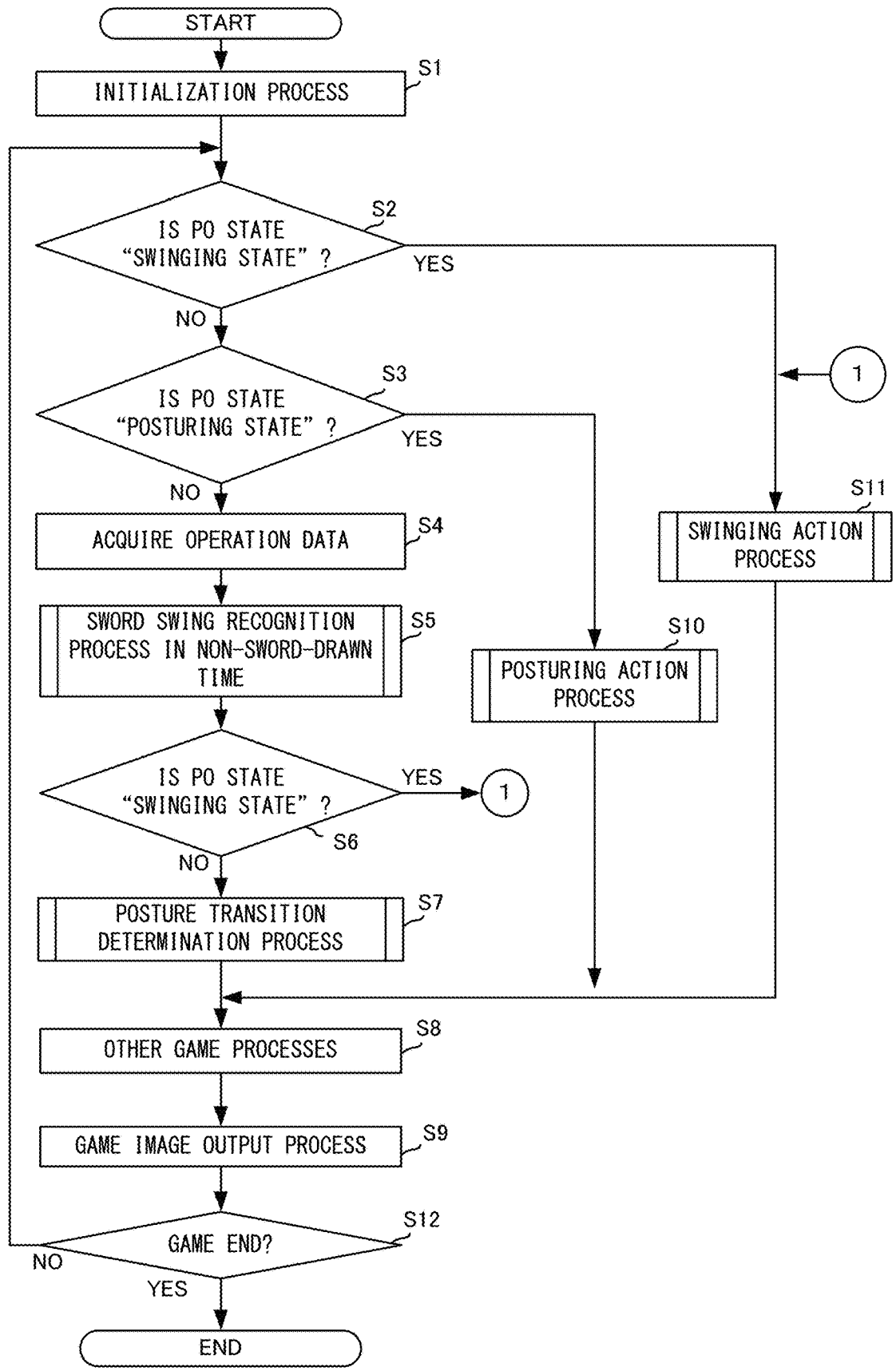
FIG. 24 is a non-limiting example of a flowchart showing details of game processing according to the exemplary embodiment.

FIG. 24 is a flowchart showing details of this game processing. In FIG. 24, first, in step S1, the processor 81 executes an initialization process for initializing data to be used in the processing thereafter. Specifically, data indicating the "non-sword-drawn state" is stored as the PO state information 308 in the DRAM 85. Further, the processor 81 sets, in the virtual camera setting data 311, various parameters (position, angle of view, gaze point) that enable display of a game image seen from behind the player object 201, as shown in FIG. 8. Further, the processor 81 constructs a three-dimensional virtual game space and places the player object 201 and the like as appropriate. A game image obtained by the virtual camera capturing the thus constructed game space is generated, and the generated game image is outputted to the stationary monitor or the like.

Next, in step S2, the processor 81 refers to the PO state information 308 and determines whether or not the PO state is the swinging state. As a result of this determination, when the PO state is the swinging state (YES in step S2), the processor 81 executes the process of step S11 described later. Meanwhile, when the PO state is not the swinging state (NO in step S2), the processor 81 determines, in step S3, whether or not the PO state is the posturing state. As a result, when the PO state is the posturing state (YES in step S3), the processor 81 advances to the process of step S10 described later.

Meanwhile, when the PO state is not the posturing state (NO in step S3), the PO state is the non-sword-drawn state, and thus, the processor 81 acquires the operation data 302 from the DRAM 85 in step S4.

Next, in step S5, the processor 81 executes a sword swing recognition process in non-sword-drawn time. This is a process for determining whether or not either of the "flicking operation" and the "rotating slash operation" as described above has been performed in the non-sword-drawn state.

Figure 25:
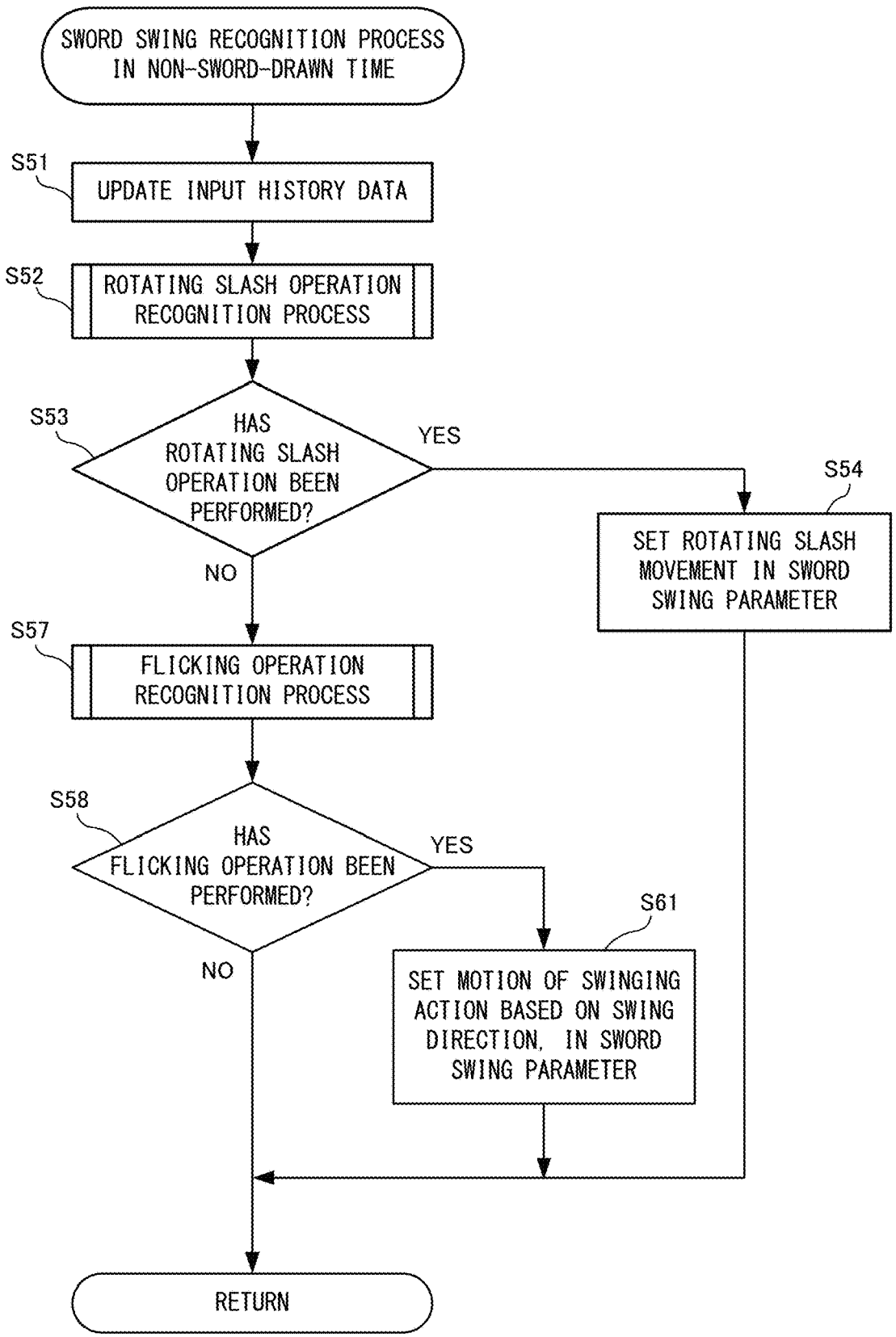
FIG. 25 is a non-limiting example of a flowchart showing details of a sword swing recognition process in non-sword-drawn time.

FIG. 25 is a flowchart showing details of the sword swing recognition process in non-sword-drawn time. In FIG. 25, first, in step S51, the processor 81 extracts operation data of the right stick 52 from the acquired operation data 302. Then, the processor 81 updates the input history data 309 such that the data is indicated as the newest input content.

Figure 26:
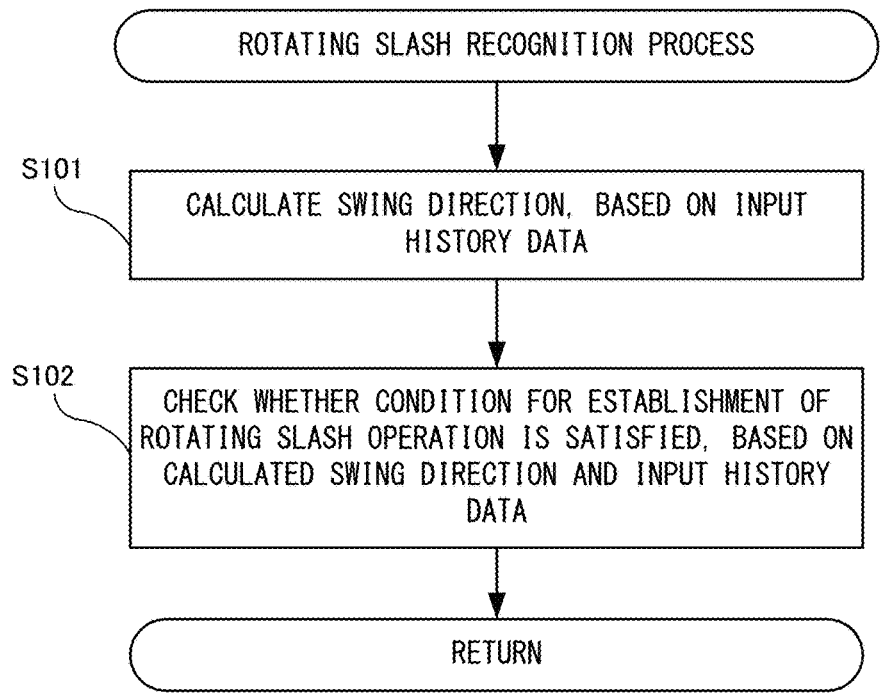
FIG. 26 is a non-limiting example of a flowchart showing details of a rotating slash recognition process.

Next, in step S52, the processor 81 executes a rotating slash operation recognition process. This is a process for determining whether or not the rotating slash operation as described above has been performed, on the basis of the input history data 309. FIG. 26 is a flowchart showing details of the rotating slash operation recognition process. In FIG. 26, first, in step S101, the processor 81 calculates, on the basis of the input history data 309, a "swing direction" in which the sword is to be swung. Specifically, the processor 81 calculates a vector (hereinafter, a newest input vector) from the origin to the newest input coordinate. Then, the processor 81 calculates, as the swing direction, a vector by normalizing the newest input vector.

Next, in step S102, on the basis of the calculated swing direction and the input history data 309, the processor 81 determines whether or not conditions for determining that the rotating slash operation is established are satisfied. Specifically, with respect to each of a plurality of conditions shown below, the processor 81 determines whether or not the condition is satisfied. Then, the processor 81 generates data indicating the determination result regarding each condition, and temporarily stores the generated data in the DRAM 85. It should be noted that, in the exemplary embodiment, when all of the conditions below are satisfied, it is determined (in step S53 described later) that the rotating slash operation has been performed.

<Rotating slash condition 1> That the last input content indicates an input in an outside-directed orientation. In other words, the newest input coordinate is in the vicinity of the outer circumference of the stick plane, and the input coordinate in the immediately preceding frame is not present in the vicinity of the outer circumference.

Figure 27:
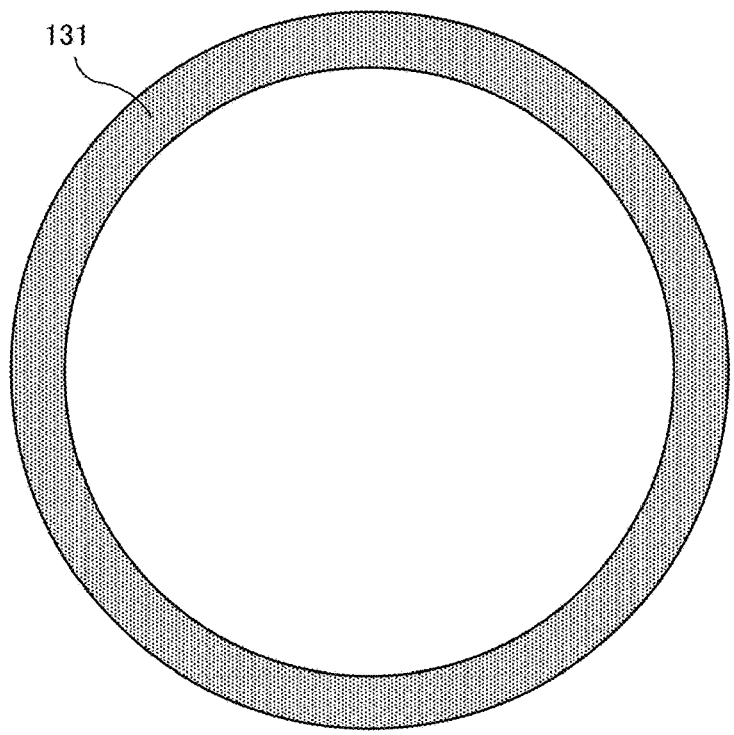
FIG. 27 illustrates a non-limiting example of the rotating slash recognition process.

As for this condition, first, in the exemplary embodiment, as shown in FIG. 27, a predetermined region that is in the vicinity of the outer circumference of the stick plane is defined as an end region 131 (e.g., a range in which the displacement amount from the center is 0.8 to 1.0). Then, when the input coordinate is present in this range, it is considered that the right stick 52 has been tilted to the maximum up to an end in the movable range of the right stick 52 (the end region 131 may also be shared, in the same meaning, in the determination of each operation described later). Therefore, as for the determination regarding this condition, when the newest input coordinate is in the end region 131 and the immediately preceding input coordinate is outside the end region, it is determined that the condition is satisfied. It should be noted that this condition is for preventing an input in the form of a large circle along the outer circumference of the stick plane from being determined as a rotating slash.

<Rotating slash condition 2> That, when the inner product of the swing direction and the displacement of each of input coordinates in the newest 15 frames is calculated, the sum of the values that are not less than 0 is not less than a certain value.

This condition is for determining that, when the distance of the return way in the rotating slash operation is checked, and if the distance is not less than a certain value, the condition for the rotating slash operation has been satisfied. That is, whether the right stick 52 has been moved from an end to an end and returned to the original position in a short period of 15 frames, is checked.

<Rotating slash condition 3> That, when the inner product of the swing direction and each of input values in the newest 15 frames is calculated, the minimum value thereof is not greater than a certain value.

This condition is for determining that, when the distance between the origin and the point that is most separated from the origin in the direction opposite to the swing direction is checked, and if this distance is not less than a certain value, the condition for the rotating slash operation has been satisfied.

<Rotating slash condition 4> That the maximum value of the distance between each of inputs in the newest 15 frames and a straight line drawn from the center of the stick plane toward the swing direction is not greater than a certain value.

Figure 28:
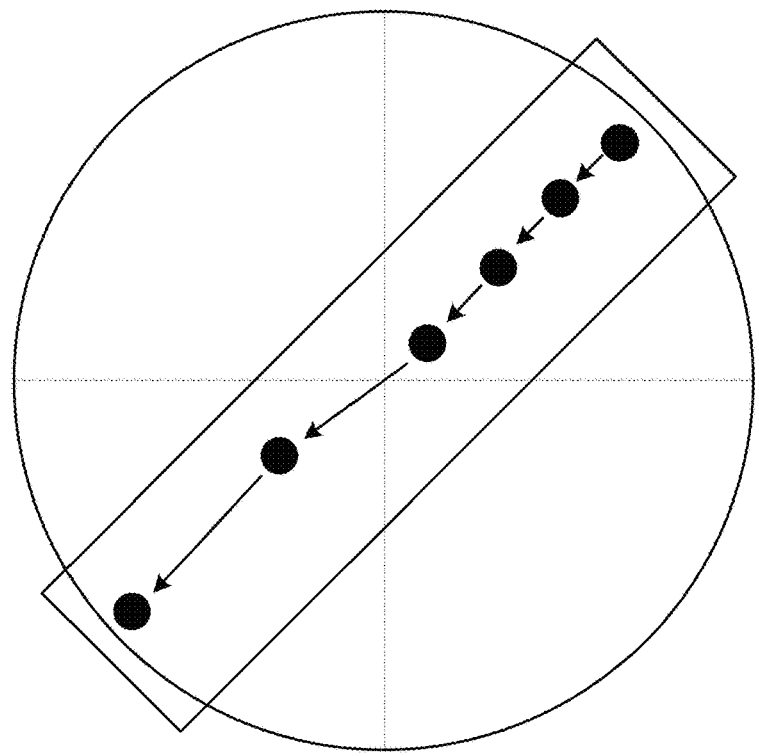
FIG. 28 illustrates a non-limiting example of the rotating slash recognition process.

This condition is for preventing, when an input that can be considered as rotation of the right stick 52 has been performed, the input from being determined as an input that corresponds to a rotating slash operation. That is, this condition is for determining whether the input trajectory passes near the straight path passing the center as shown in FIG. 28.

Upon ending of the condition checking process in step S102, the rotating slash operation recognition process ends.

With reference back to FIG. 25, next, in step S53, on the basis of data indicating the determination result of each condition in the above rotating slash operation recognition process, the processor 81 determines whether or not the rotating slash operation has been performed. That is, the processor 81 determines whether or not all of the above-described four conditions have been satisfied, and when all of the four conditions have been satisfied, the processor 81 determines that the rotating slash operation has been performed. As a result of the determination, when the rotating slash operation has been performed (YES in step S53), the processor 81 performs, in step S54, setting for causing the player object 201 to perform the rotating slash movement. Specifically, first, the processor 81 sets the "swinging state" in the PO state information 308. Next, the processor 81 sets, in the sword swing parameters 310, various values related to motions of the sword 204 and the player object 201 such that a rotating slash motion corresponding to the calculated swing direction is performed. For example, when the swing direction is the right direction, the contents of the sword swing parameters 310 are set such that the player object 201 performing a rotating slash motion in which the player object 201 rotates rightward is displayed (reproduced) over a predetermined number of frames. That is, parameters indicating the orientation of the player object 201 and the moving direction and the moving speed of the sword 204 in each frame during the rotating slash motion are set. Further, a hitting determination region of the sword 204 in the rotating slash motion is also set. As for a specific method for setting the sword swing parameters 310, for example, the contents of rotating slash motions corresponding to swing directions are defined in advance, and on the basis of the swing direction, one of the defined rotating slash motions may be selected. Alternatively, on the basis of the above swing direction and an initial velocity parameter defined in advance, sword swing parameters that realize a rotating slash motion may be calculated each time. Upon ending of the various settings, the processor 81 ends the sword swing recognition process. It should be noted that, in the swinging action process described later, movement control of the player object 201 and the sword 204 is performed on the basis of the various parameters set here.

Meanwhile, as a result of the determination in step S53, when the rotating slash operation has not been performed (NO in step S53), the processor 81 next executes a flicking operation recognition process in step S57. In this process, a process of recognizing whether or not the flicking operation as described above has been performed is executed.

Figure 29:
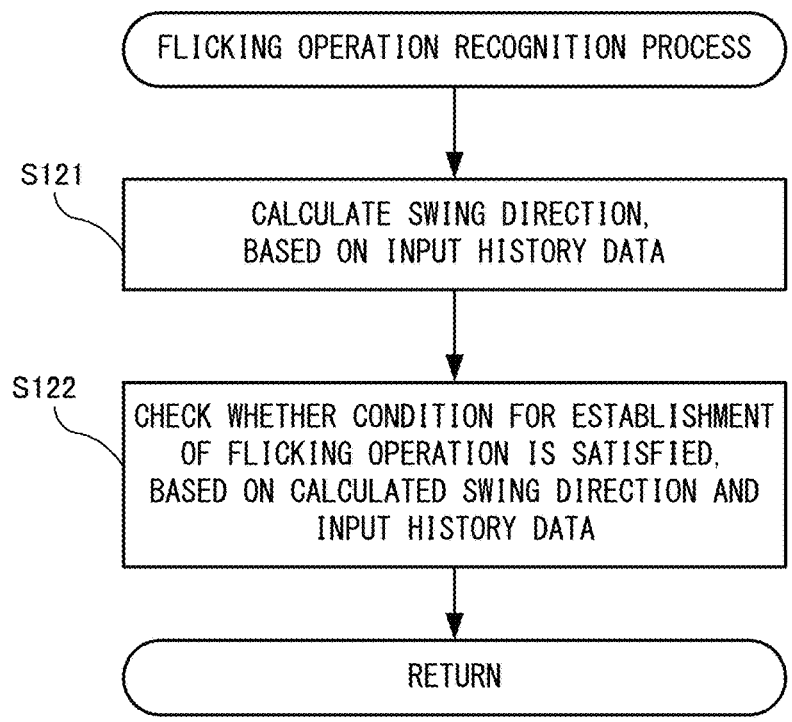
FIG. 29 is a non-limiting example of a flowchart showing details of a flicking operation recognition process.

FIG. 29 is a flowchart showing details of the flicking operation recognition process. In FIG. 29, first, in step S121, the processor 81 calculates a "swing direction" in a flicking operation on the basis of the input history data 309. In the case of a flicking operation, movement of the right stick 52 is realized as a motion in which the right stick 52 reciprocates between the center and the vicinity of the outer circumference, such as "center→vicinity of outer circumference→center". In the exemplary embodiment, as the swing direction in this case, the direction (direction from the center toward the outer side) in the going way is basically used. However, as a specific calculation method, a vector in the return way is calculated once, this vector is inversed, and the resultant vector is obtained as the swing direction. The motion in the going way is realized as a manual input, but the motion in the return way is realized by the return mechanism provided to the right stick 52. Therefore, a more linear trajectory is realized in the return way than in the going way in which a manual input is performed. Therefore, by inversing the vector in the return way, a more appropriate value can be used as the swing direction. More specifically, the swing direction is calculated as follows.

(B1) First, the processor 81 extracts an input coordinate on the most outer circumference side among input coordinates in the last several frames (e.g., 5 frames), calculates a vector from the center, and normalizes the vector.

(B2) Next, the processor 81 calculates the inner product of the above normalized vector and each of displacement amounts of inputs in the last several frames, and calculates the sum of vectors whose inner product values are smaller than 0.

(B3) Then, the calculated vector is normalized and the normalized vector is inversed by multiplying by a minus sign, whereby the resultant vector is obtained as the swing direction.

Next, in step S122, on the basis of the calculated swing direction and the input history data 309, the processor 81 determines whether or not conditions for determining that the flicking operation is established are satisfied. Specifically, with respect to the conditions indicated below, the processor 81 determines whether or not each condition is satisfied.

<Flicking Operation Condition 1> That the Input Coordinates in the Newest 2 Frames are Both at the Center.

Figure 30:
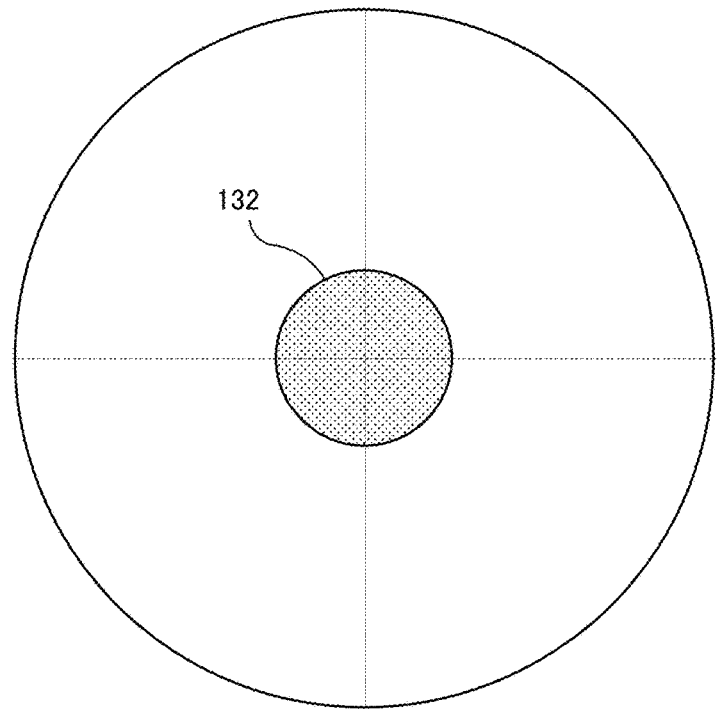
FIG. 30 illustrates a non-limiting example of the flicking operation recognition process.

This condition is for distinguishing the flicking operation from the above-described rotating slash operation. For example, as the rotating slash operation, a case where the input has been performed as "right→left→right" is assumed. In this case, this trajectory is, specifically, "right→center→left→center→right". In this trajectory, if determination that the "flicking operation" has been performed is made when an input of "center→left→center" has been performed, the rotating slash cannot be executed. In consideration of such a case, in order to distinguish the flicking operation from the rotating slash operation, both of the input coordinates in the newest 2 frames being at the center is set as a condition for the flicking operation to be established. Here, in the exemplary embodiment, determination as to "being at the center" is made in a not-so-strict manner. Specifically, as shown in FIG. 30, a circular region whose center is set at the center point of the stick plane and that includes a region in the vicinity of the center point is defined in advance as a center region 132 (e.g., a range in which the displacement amount from the center is not greater than 0.2). Then, when the input coordinate is in the center region 132, the input coordinate is considered to be "at the center". Therefore, strictly speaking, "both of the input coordinates in the newest 2 frames are at the center or in the vicinity of the center" is the condition, but, for convenience of description, both cases of "being at the center" and "being in the vicinity of the center" are considered as "being at the center".

<Flicking Operation Condition 2> That the Sum of Inward Displacements and the Sum of Outward Displacements in the Newest (Last) Several Frames, with Respect to the Swing Direction, are Each not Less than a Certain Value.

Figure 31:
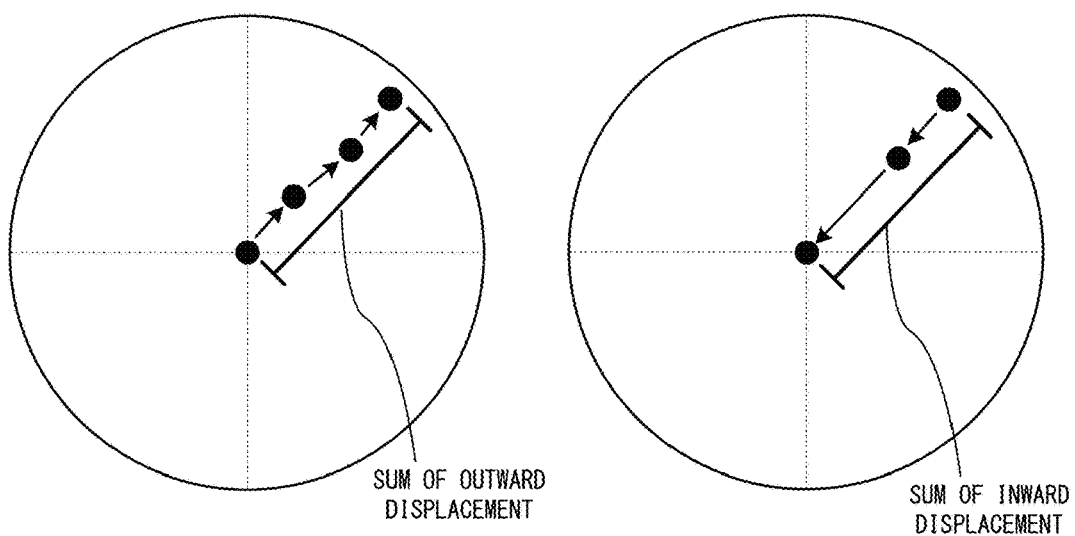
FIG. 31 illustrates a non-limiting example of the flicking operation recognition process.

This condition is for checking, with respect to each of the going way and the return way, whether a sufficiently large displacement in which the right stick 52 has been displaced to an end and returned to the center (i.e., a flicking operation) has occurred. Specifically, the processor 81 calculates the inner product of the swing direction and the displacement in each of the newest several frames (e.g., about 5 to 7 frames). As a result of the calculation, the inner product in the forward direction (outward direction) with respect to the swing direction is calculated as a positive value, and the inner product in the direction (direction toward the center) opposite to the swing direction is calculated as a negative value. Then, as shown in FIG. 31, the processor 81 determines whether the sum of inner products in the positive direction is not less than a certain value and the sum of inner products in the negative direction is not greater than a certain value.

<Flicking Operation Condition 3> That the Swing Direction Matches the Displacement Direction of the Stick Position in the Past Several Frames.

Figure 32:
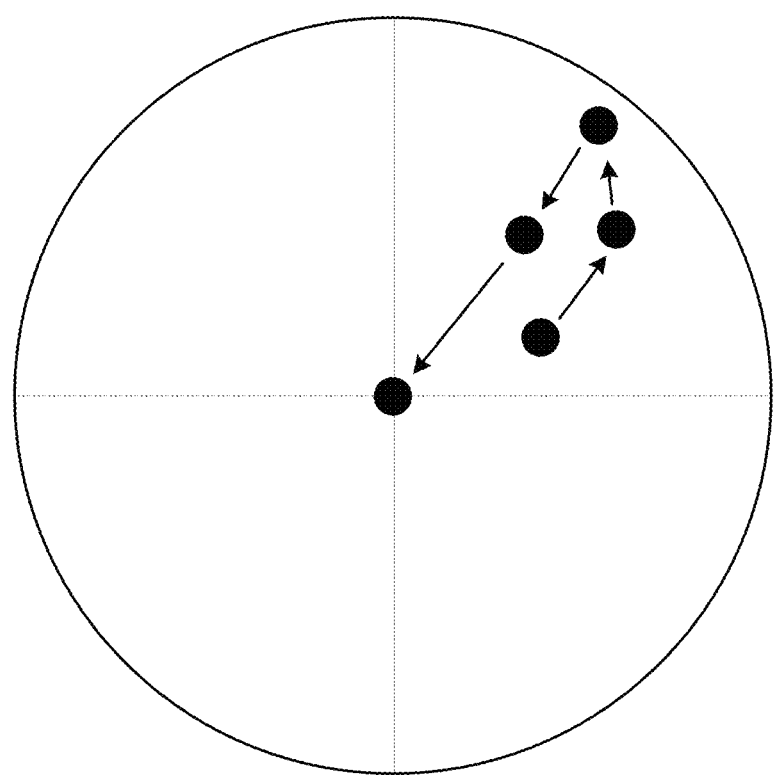
FIG. 32 illustrates a non-limiting example of the flicking operation recognition process.

This condition is for excluding, from the flicking operation, a case where the input of the right stick 52 has been performed in a slightly rotated manner as shown in FIG. 32. Specifically, the following process is performed. First, with respect to the input coordinate in each of the past several frames, the processor 81 calculates an angle between a line drawn from the center point to each input coordinate and a line drawn from the center point toward the swing direction. Then, the processor 81 determines whether or not the sum of these angles is not greater than a predetermined threshold, and when the sum of these angles is not greater than the predetermined threshold, the processor 81 determines that the condition is satisfied. That is, when the angle difference between the going way and the return way in a flicking operation is not greater than a predetermined threshold, it is determined that the condition is satisfied.

<Flicking Operation Condition 4> That the Total Distance of a Certain Number of Frames is not Greater than a Certain Value.

This condition is for excluding an operation (hereinafter, a "fast random input operation") of consecutively moving the right stick 52 in a plurality of random directions in a short period. In the case of such a "fast random input operation", the total distance of the input trajectory in a certain number of frames is also considered to be increased. Therefore, when this condition is used, the fast random input operation can be prevented from being determined as a flicking operation.

In the exemplary embodiment, the above four conditions are used as the determination conditions for the flicking operation. However, in another exemplary embodiment, the conditions as follows may further be used for the determination.

<Flicking Operation Condition 5> That the Current Input Coordinate is at the Center, or that "the Movement Vector Connecting the Newest Input Coordinate of the Right Stick 52 and the Input Coordinate in the Immediately Preceding Frame" has Passed the Center.

This condition is for determining that, even when the input coordinate has passed the center in one frame, the current input coordinate is at the center. In a case where the spring of the return mechanism of the right stick 52 is strong, even when the right stick 52 has been released from the finger, the input coordinate once passes the center point and then returns to the center point before completely stopping at the center point. In consideration of such a case, in order to quickly detect a flicking operation at the stage where the input coordinate has passed the center, the flicking operation is determined at the time point of detection of the input coordinate having passed the center. As for the determination of "having passed the center", not only the case of passing the center point, but also a case where the trajectory connecting the newest input coordinate of the right stick 52 and the input coordinate in the immediately preceding frame passes the above-described center region 132 may be determined as "having passed the center". In other words, in the case of a positional relationship where the center region 132 is between temporally-consecutive two input coordinates, it may be determined that the right stick 52 has passed the center.

<Flicking Operation Condition 6> That, in a Period of a Predetermined Number of Past Frames, the Input Coordinate was Present at the Center for not Less than a Certain Number of Frames.

This condition is for excluding the fast random input operation as in the flicking operation condition 4 above. In the case of the fast random input operation, it is considered that the input coordinate does not stay at the center for a certain period. Thus, if this condition is used, whether or not the fast random input operation is being performed can be determined. More specifically, in an example where the input history corresponds to 20 frames, when all of input coordinates in a period of 10 frames before to 15 frame before are in the state of "being at the center", it is determined that this condition is satisfied.

Upon ending of the condition checking process regarding the flicking operation in step S122, the flicking operation recognition process ends.

With reference back to FIG. 25, next, in step S58, the processor 81 determines whether or not the flicking operation has been performed, on the basis of data indicating the determination result of each condition in the flicking operation recognition process. That is, the processor 81 determines whether or not all of the above-described four conditions are satisfied, and when all of the four conditions are satisfied, the processor 81 determines that the flicking operation has been performed. As a result of this determination, when the flicking operation has been performed (YES in step S58), the processor 81 performs, in step S61, setting for causing the player object 201 to perform the swinging action. The setting content is for causing a swinging action based on the above flicking operation, to be performed. Specifically, first, the processor 81 sets the "swinging state" in the PO state information 308. Next, the processor 81 sets, in the sword swing parameters 310, various values related to motions of the sword 204 and the player object 201 such that a motion of a sword swinging action corresponding to the calculated swing direction is performed. For example, when an operation of flicking the stick toward the right end has been performed, the contents of the sword swing parameters 310 are set such that the player object 201 performing a motion of swinging (e.g., horizontal slashing) the sword 204 in the right direction is displayed (reproduced) over a predetermined number of frames. In this case, swinging of the sword 204 is started from the state where the stick is at the neutral position. Therefore, for example, a motion in which the player object 201 swings the sword 204 in the right direction from the orientation immediately after the sword drawing as shown in FIG. 9 may be displayed. Alternatively, a motion in which the sword 204 is once moved in the left direction and then swung in the right direction may be displayed. Upon ending of the setting of the sword swing parameters 310, the processor 81 ends the sword swing recognition process in non-sword-drawn time.

The process of step S61 can also be executed when the "opposite-direction input operation" and the "release operation" in the posturing state described later have been recognized. In the exemplary embodiment, except for the difference in the swing direction, the motion set in this process is basically common between the "opposite-direction input operation", the "flicking operation", and the "release operation". In other words, the process of step S61 can be said to be a process of setting a motion corresponding to the swing direction recognized for each of the "opposite-direction input operation", the "flicking operation", and the "release operation".

Further, also with respect to the method for setting the sword swing parameters in this process, one of motions defined in advance so as to correspond to swing directions may be selected, as in the case of the rotating slash described above. Alternatively, appropriate sword swing parameters may be calculated in the process on the basis of the swing direction and a predetermined initial velocity parameter (a similar setting method is used also in the case of the opposite-direction input operation and the release operation described later).

Meanwhile, as a result of the determination in step S58, when the flicking operation has not been performed (NO in step S58), it means that the rotating slash operation and the flicking operation in the non-sword-drawn state have not been performed. In this case, the processor 81 ends the sword swing recognition process in non-sword-drawn time.

Figure 33:
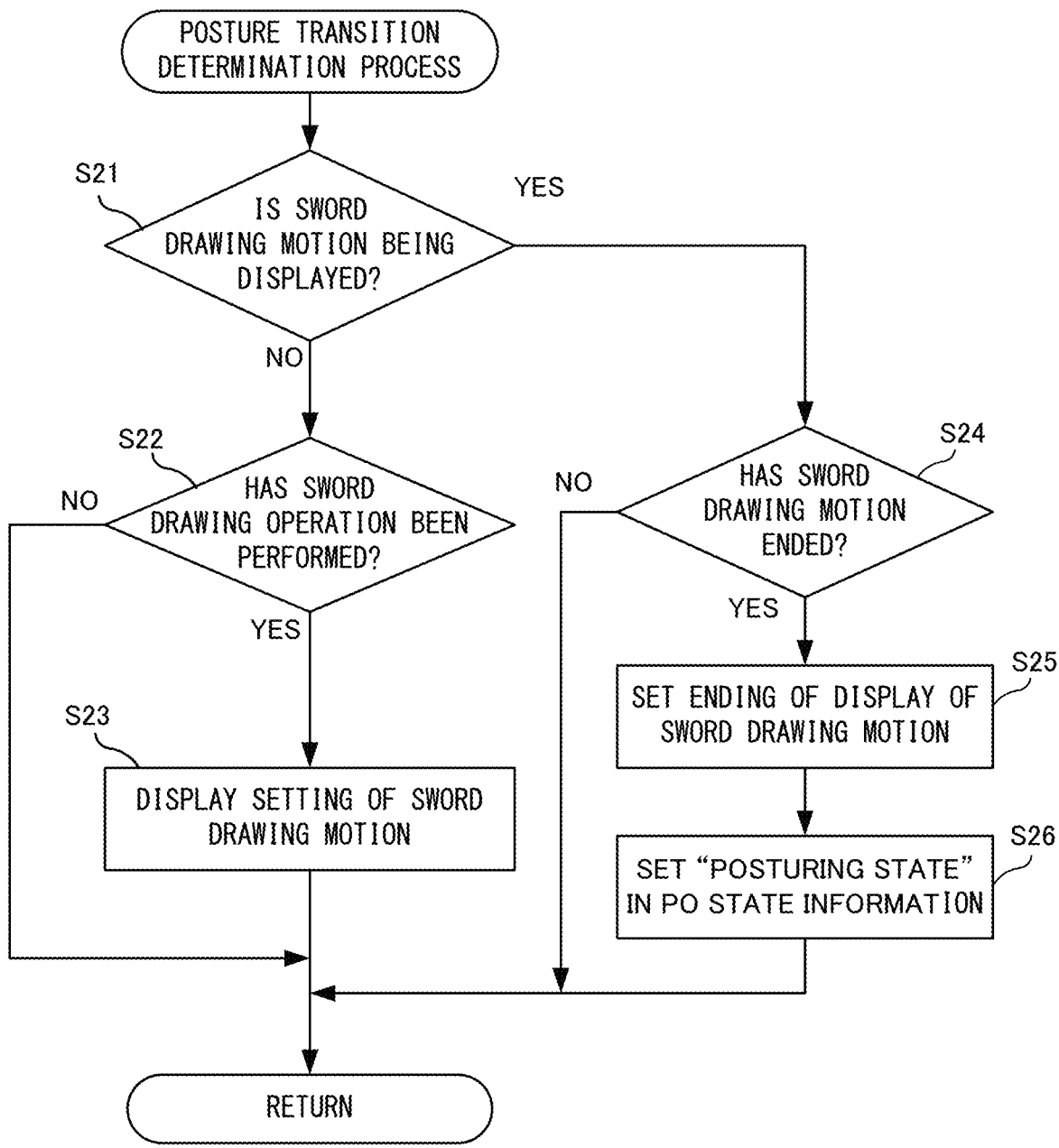
FIG. 33 is a non-limiting example of a flowchart showing details of a posture transition determination process.

With reference back to FIG. 24, upon ending of the sword swing recognition process in non-sword-drawn time, next, in step S6, the processor 81 determines whether or not, as a result of the sword swing recognition process in non-sword-drawn time, the PO state has changed to the "swinging state". As a result of this determination, when the PO state is the "swinging state" (YES in step S6), the process of step S11 described later is executed. Meanwhile, when the PO state is not the "swinging state" (NO in step S6), the processor 81 executes a posture transition determination process in step S7. In this process, for example, determination of whether or not to transition the PO state from the non-sword-drawn state to the posturing state is performed. FIG. 33 is a flowchart showing details of the posture transition determination process. In FIG. 33, first, in step S21, in the process regarding the current frame, whether or not a sword drawing motion is being displayed is determined. In the exemplary embodiment, when an operation of instructing sword drawing has been performed, a motion of the player object 201 drawing the sword 204 is displayed over several frames. This determination is for determining whether or not this motion is being displayed. As a result of this determination, when the sword drawing motion is not being displayed (NO in step S21), the processor 81 determines, in step S22, whether or not a sword drawing operation has been performed, on the basis of the operation content indicated by the operation data 302. In the exemplary embodiment, whether or not a predetermined button assigned for the sword drawing operation has been pressed is determined. In addition to this, in another exemplary embodiment, for example, it may be determined that the sword drawing operation has been performed, also when the right controller 4 has been swung at not less than a predetermined acceleration, or when a direction input to the right stick 52 has occurred.

As a result of the determination above, when the sword drawing operation has been performed (YES in step S22), the processor 81 performs, in step S23, display setting for displaying the sword drawing motion above. On the basis of this setting, the sword drawing motion is displayed in a game image output process of step S9 described later. In addition, due to this setting, in the determination in step S21, it is determined that the sword drawing motion is being displayed. This setting can be set by, for example, turning on a flag (not shown) indicating that the sword drawing motion is being displayed.

Meanwhile, when the sword drawing operation has not been performed (NO in step S22), the process of step S23 is skipped, and the posture transition determination process ends.

Next, a case where, as a result of the determination in step S21, it has been determined that the sword drawing motion is being displayed (YES in step S21), is described. In this case, in step S24, the processor 81 determines whether or not the sword drawing motion has ended. When the sword drawing motion has not ended (NO in step S24), the posture transition determination process ends. As a result, the sword drawing motion is continued to be displayed. Meanwhile, when the sword drawing motion has ended (YES in step S24), the processor 81 sets, in step S25, ending of the display of the sword drawing motion. For example, the processor 81 turns off the above-described flag indicating that the sword drawing motion is being displayed. Next, in step S26, the processor 81 sets data indicating a posturing state, in the PO state information 308. That is, in the exemplary embodiment, until the sword drawing motion ends, the PO state does not transition to the posturing state. It should be noted that, in another exemplary embodiment, the PO state may be caused to transition to the posturing state at the time point when the sword drawing operation has been performed. Then, the posture transition determination process ends.

With reference back to FIG. 24, next, in step S8, the processor 81 executes various game processes other than a posturing action process and a swinging action process which are described later. Specifically, a process of moving the player object 201 on the basis of the operation content (the left analog stick data 305) of the left stick 32 is performed. In addition, on the basis of the operation content of the right stick 52 with the first R-button 60 pressed, a process of changing parameters of the virtual camera is also performed. Further, in the case where the sword drawing motion is being displayed, a process of causing the player object 201 to perform a predetermined sword drawing motion is also executed. Other than these, also while the player object 201 is not performing the posturing action and the swinging action, various game processes related to the progress of the game are executed as appropriate.

Next, in step S9, the processor 81 executes a game image output process. Specifically, the processor 81 generates a game image by causing the virtual camera to capture the virtual game space reflecting the results of the above processes and of the posturing action process and the swinging action process which are described later. Then, the processor 81 outputs the game image to the stationary monitor.

Next, in step S12, the processor 81 determines whether or not an ending condition for the game according to the exemplary embodiment has been satisfied. Examples of the ending condition include that the player has performed an ending operation of the game. As a result of this determination, when the determination is YES, the processor 81 ends the game processing, and when the determination is NO, the processor 81 returns to step S2 and repeats the game processing according to the exemplary embodiment. That is, until the game processing ends, the processes from step S2 to step S10 are repeated for each frame, which is the time unit for rendering.

[Posturing Action Process]

Figure 34:
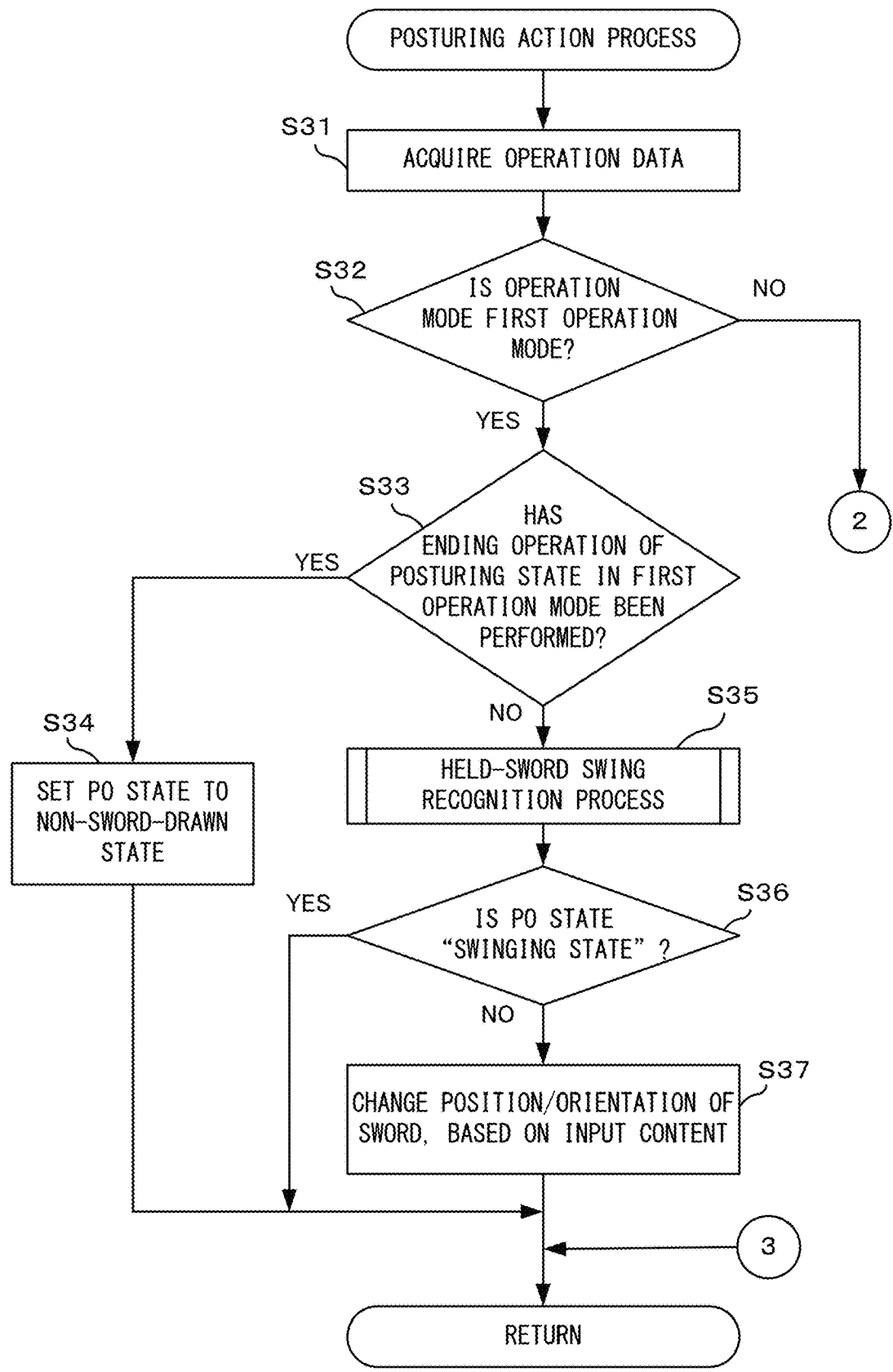
FIG. 34 is a non-limiting example of a flowchart showing details of a posturing action process.
Figure 35:
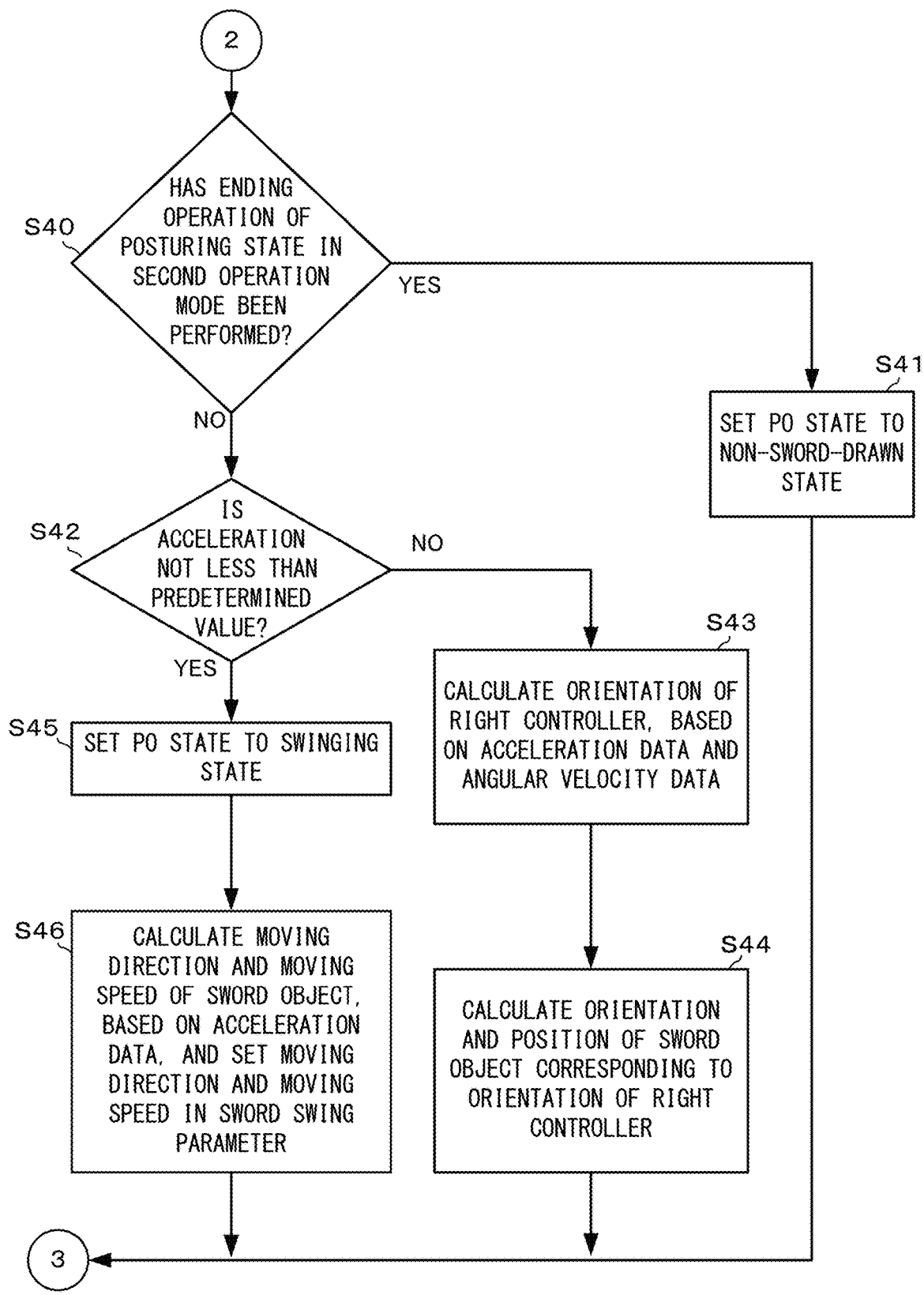
FIG. 35 is a non-limiting example of a flowchart showing details of the posturing action process.

Next, the posturing action process in step S10 is described. This process is a process for reflecting the operation of the user in the posturing state, in the movement of the player object 201, in accordance with the operation mode. Each of FIGS. 34 and 35 is a flowchart showing details of the posturing action process. In FIG. 34, first, in step S31, the processor 81 acquires the operation data 302.

Next, in step S32, the processor 81 determines whether or not the current operation mode is the first operation mode (the operation mode using the right stick 52). As a result of this determination, when the current operation mode is the first operation mode (YES in step S32), the processor 81 determines, in step S33, whether or not an operation (sword sheathing operation) for ending the posturing state in the first operation mode has been performed. In the exemplary embodiment, this ending operation is pressing of a predetermined button. It should be noted that, in the exemplary embodiment, the operation for ending the posturing state is common between the first operation mode and the second operation mode. With respect to this ending operation, when different operations are adopted between the first operation mode and the second operation mode, the operation contents may be determined so as to be suitable for the respective modes.

As a result of the determination above, when the operation for ending the posturing state in the first operation mode has been performed (YES in step S33), the processor 81 sets the non-sword-drawn state in the PO state information 308 in step S34. In addition, the processor 81 also performs as appropriate display setting for a sword sheathing motion of putting the sword 204 into the sheath. Then, the posturing action process ends.

Meanwhile, as a result of the determination above, when the operation for ending the posturing state has not been performed (NO in step S33), the processor 81 executes a held-sword swing recognition process in step S35. This process is a process for determining whether or not any one of the above-described "flicking operation", "opposite-direction input operation", "release operation", and "rotating slash operation" has been performed in the posturing state.

Figure 36:
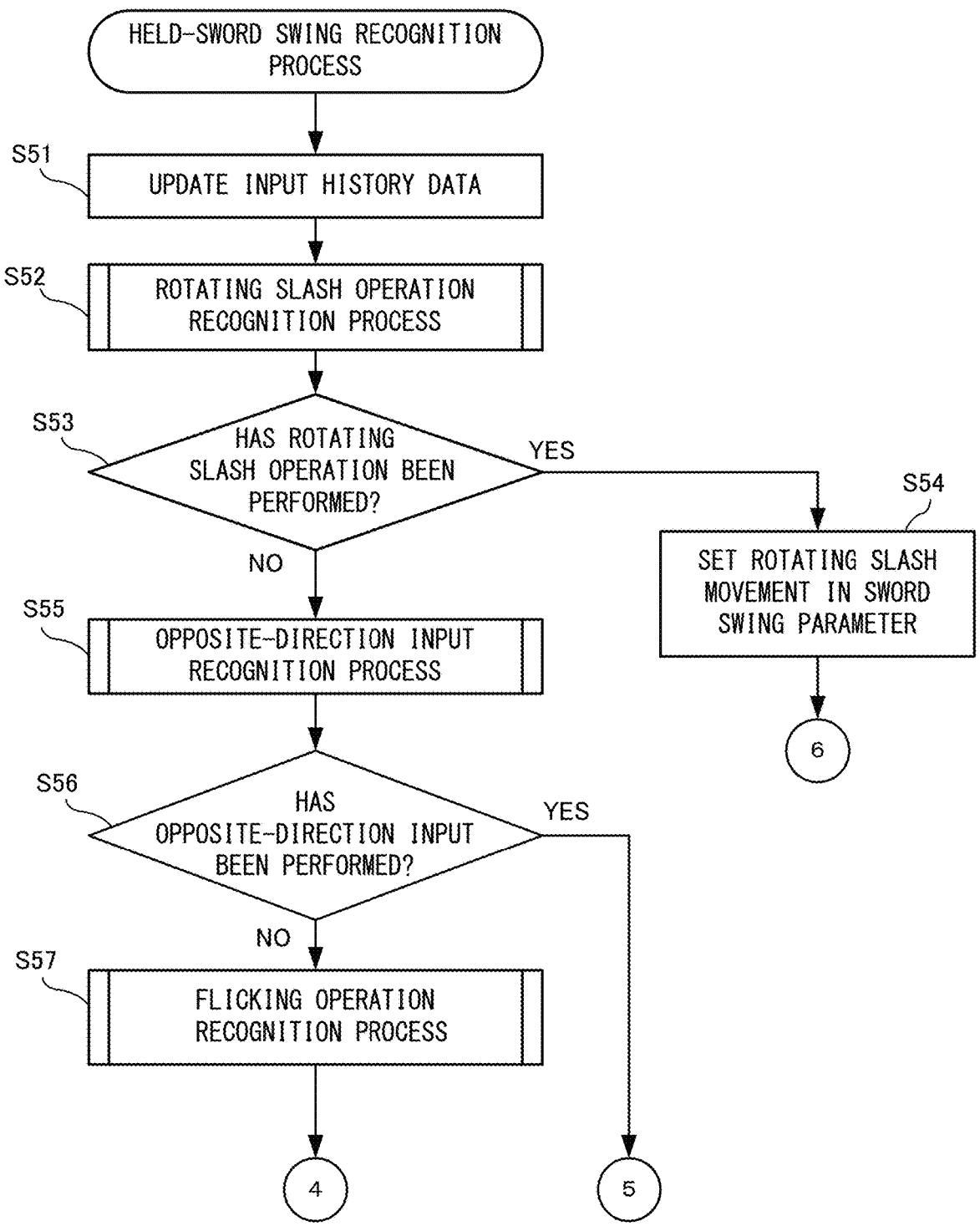
FIG. 36 is a non-limiting example of a flowchart showing details of a held-sword swing recognition process.
Figure 37:
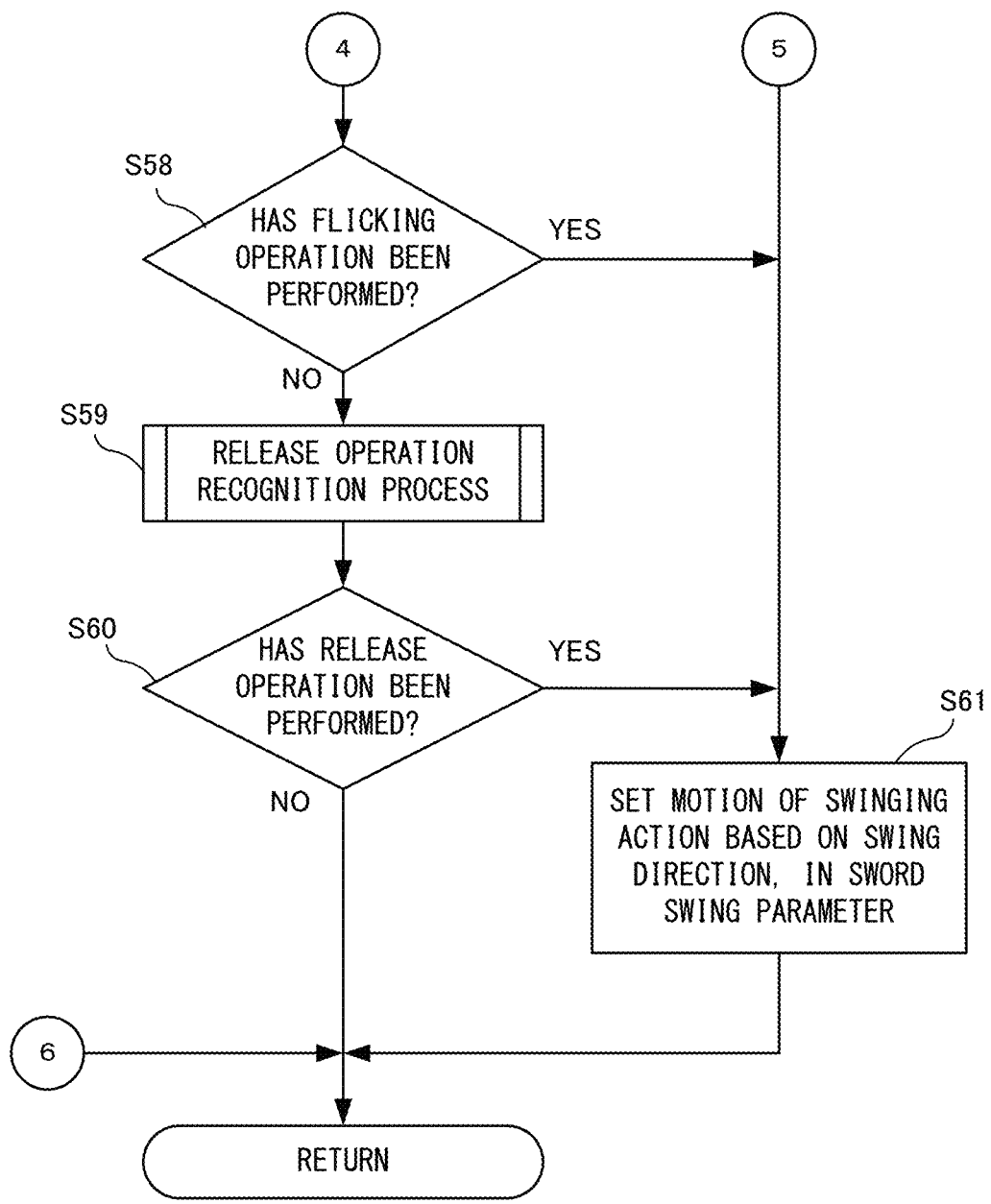
FIG. 37 is a non-limiting example of a flowchart showing details of the held-sword swing recognition process.

Each of FIGS. 36 and 37 is a flowchart showing details of the held-sword swing recognition process. It should be noted that, in the flowcharts, the processes of steps S51 to S54, S57 and S58, and S61 are the same as the processes in the sword swing recognition process in non-sword-drawn time described above with reference to FIG. 25. Therefore, description of these processes is omitted, and here, processes (steps S55 and S56, and S59 and S60) for recognizing the "opposite-direction input operation" and the "release operation" are mainly described.

First, the process regarding recognition of the "opposite-direction input operation" is described. As a result of the determination in step S53 in FIG. 36, when the rotating slash operation has not been performed (NO in step S53), the processor 81 next executes an opposite-direction input recognition process in step S55. In this process, a process of recognizing whether or not the opposite-direction input operation as described above has been performed is executed.

Figure 38:
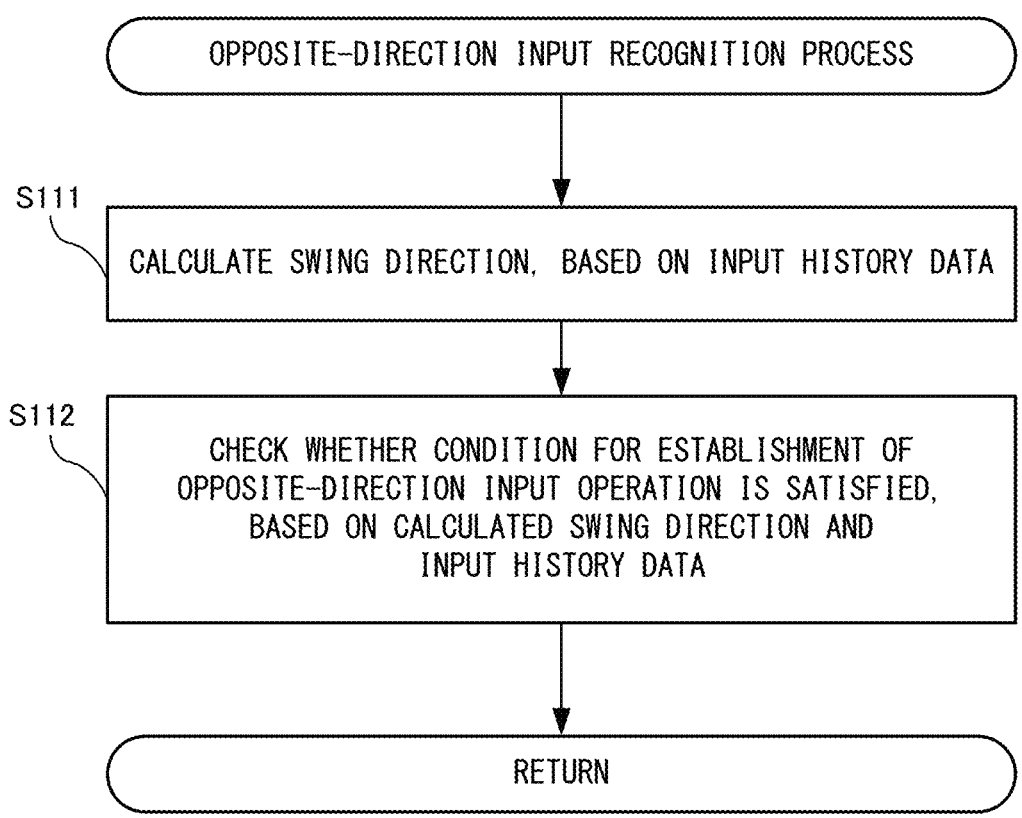
FIG. 38 is a non-limiting example of a flowchart showing details of an opposite-direction input recognition process.

FIG. 38 is a flowchart showing details of the opposite-direction input recognition process. In FIG. 38, first, in step S111, the processor 81 calculates the "swing direction" in the opposite-direction input operation on the basis of the input history data 309. The opposite-direction input is an operation of moving (tilting) the right stick 52 from a state of holding the sword 204 in the posturing to the end in the opposite direction. Therefore, this moving direction is calculated as the swing direction. Thus, here, it is determined whether or not the input trajectory of the right stick 52 is a trajectory that has changed in several frames as "end in a predetermined direction→end in the opposite direction". Specifically, the processor 81 calculates the swing direction as follows.

(A1) First, the processor 81 calculates the above-described newest input vector and normalizes the newest input vector, thereby calculating a "current input direction".

(A2) Next, the processor 81 calculates the inner product of the "current input direction" and the input value in each of the past 14 frames, and temporarily stores the input whose inner product value is the smallest (=farthest) into the DRAM 85.

(A3) Further, the processor 81 normalizes a vector obtained by subtracting the above "input whose inner product value is the smallest", from the "current input direction", and temporarily stores the normalized vector as a "trajectory advancement direction" into the DRAM 85.

(A4) Then, the processor 81 adds the "trajectory advancement direction" vector and the "current input direction" vector and normalizes the resultant vector, thereby calculating the "swing direction".

Next, in step S112, on the basis of the calculated swing direction and the input history data 309, the processor 81 determines whether or not conditions for determining that the opposite-direction input operation is established are satisfied. Specifically, the processor 81 determines whether or not each of the conditions below is satisfied. Then, the processor 81 generates data indicating the determination result of each condition, and temporarily stores the generated data in the DRAM 85. In the exemplary embodiment, when all of the following <opposite-direction input condition 1> to <opposite-direction input condition 4> are satisfied, it is determined that the opposite-direction input operation has been performed (in step S56 described later). The number of frames shown in each condition is merely an example.

<Opposite-Direction Input Condition 1> That the Current Input Coordinate is in the Vicinity of an End of the Stick Plane.

Figure 39:
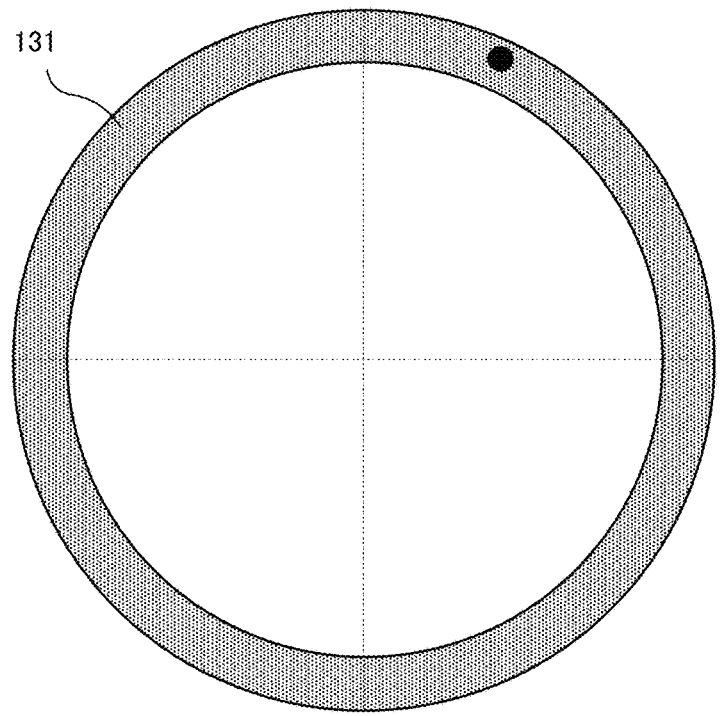
FIG. 39 illustrates a non-limiting example of the opposite-direction input recognition process.

This condition is for determining whether or not the right stick 52 is in a state of being tilted to the maximum up to the end. Specifically, as shown in FIG. 39, when the current input coordinate is within the end region 131 described above, this condition is satisfied.

<Opposite-Direction Input Condition 2> That the Input Coordinates in the Newest 8 Frames are on the Newest Input Direction Side when Viewed from the Center of the Stick Plane and Stay in the Vicinity (the End Region 131) of the Outer Circumference.

This condition is a condition required for distinguishing the opposite-direction input operation from the above "rotating slash". For example, a case where, for performing a rotating slash, a stick input has been performed as "right→left→right" is assumed. In this case, at the time point when an input of "right→left" has been performed, a sword swinging action according to the opposite-direction input operation can be performed before the rotating slash is performed. Therefore, in order to prevent this, determination according to the above condition is performed.

<Opposite-direction input condition 3> That, when the inner product of the above "trajectory advancement direction" and the input coordinate of each of the newest 14 frames is calculated, the minimum value of the inner product is not greater than a certain value. That is, the length of the input trajectory is not less than a certain value.

This condition is for checking whether the input coordinate is displaced at not less than a certain speed and the length of the input trajectory is not less than a certain length. That is, this is a condition for determining whether or not an input operation (operation of tilting the right stick 52) in the opposite direction has been performed at a speed that is fast to some extent.

<Opposite-Direction Input Condition 4> That the Input Trajectory has Passed Near a Straight Path Passing the Center of the Stick Plane.

This condition is for determining whether the input trajectory is a trajectory that is straight to some extent. Specifically, the distance between a straight line drawn from the center of the stick plane toward the "trajectory advancement direction" and each of the input coordinates corresponding to the newest 14 frames is calculated, and when the maximum value of the distance is not greater than a predetermined threshold, it is determined that the condition is satisfied.

In the exemplary embodiment, the above four conditions are used as the determination conditions for the opposite-direction input. However, in another exemplary embodiment, the condition as follows may further be used for the determination.

<Opposite-Direction Input Condition 5> That the Sum of Displacements in the Swing Direction in the Last N Frames is not Less than a Certain Value.

This condition may be used instead of the opposite-direction input condition 3 above. Specifically, the inner product of the swing direction and the displacement of the input coordinate in each frame is calculated, and whether or not the sum of positive values is not less than a certain value is determined.

<Opposite-Direction Input Condition 6> That the Sum of Absolute Values of the Outer Products in the m-th Frame and the m+1-th Frame in the Input History is Less than a Certain Value.

Figure 40:
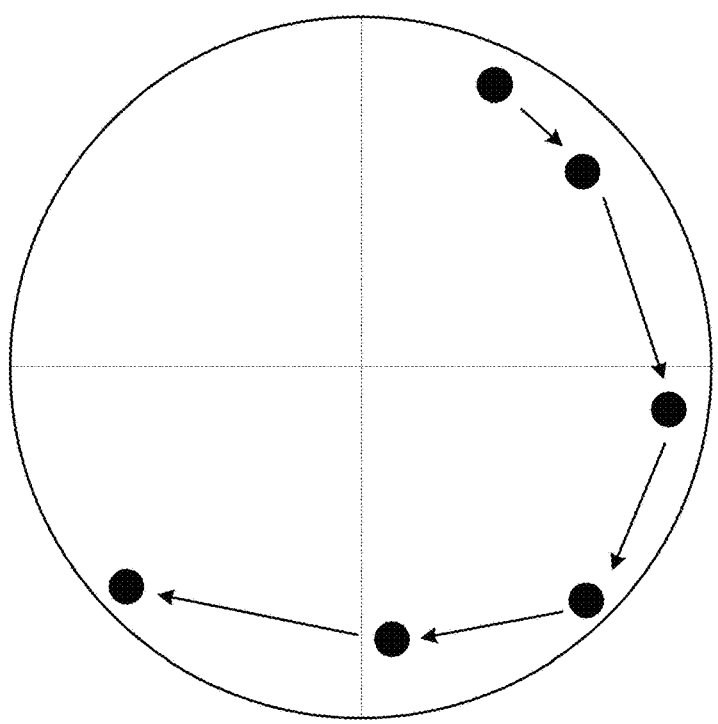
FIG. 40 illustrates a non-limiting example of the opposite-direction input recognition process.

This condition is for excluding an operation of largely rotating the right stick 52. For example, as shown in FIG. 40, a case where the right stick 52 is largely moved along the outer circumference is assumed. The aforementioned outer product is a value that is calculated as a large value in such a case. When the sum of the absolute values of the outer products is large to some extent, it can be inferred that an operation of rotating the right stick 52 along the outer circumference is being performed.

With reference back to FIG. 38, upon ending of the condition checking process regarding the opposite-direction input in step S112, the opposite-direction input recognition process ends.

With reference back to FIG. 36, next, in step S56, on the basis of data indicating the determination result of each condition in the opposite-direction input recognition process, the processor 81 determines whether or not the opposite-direction input operation has been performed. That is, the processor 81 determines whether or not all of the above-described four conditions are satisfied, and when all of the four conditions are satisfied, the processor 81 determines that the opposite-direction input operation has been performed. As a result of the determination, when the opposite-direction input operation has been performed (YES in step S56), the processor 81 performs, in step S61 in FIG. 37, setting for causing the player object 201 to perform the swinging action above. In this case, setting for a swinging action based on this opposite-direction input operation is performed. Specifically, first, the processor 81 sets the "swinging state" in the PO state information 308. Next, the processor 81 sets, in the sword swing parameters 310, various values related to motions of the sword 204 and the player object 201 such that a motion of a sword swinging action corresponding to the calculated swing direction is performed. For example, when an opposite-direction input operation of "right end→left end" has been performed, a motion in which the player object 201 swings (e.g., horizontal slashing) the sword 204 in the left direction from the orientation of holding the sword in the right direction during posturing, is performed. Therefore, the contents of the sword swing parameters 310 are set such that this motion is displayed (reproduced) over a predetermined number of frames. That is, parameters indicating the orientation of the player object 201 and the moving direction and the moving speed of the sword 204 in each frame in the sword swinging action are set. Further, a hitting determination region of the sword 204 in the sword swinging action is also set. Upon ending of the various settings, the processor 81 ends the held-sword swing recognition process.

Meanwhile, as a result of the determination in step S56, when the opposite-direction input operation has not been performed (NO in step S56), the processor 81 next executes a flicking operation recognition process in step S57. This process is the same as that described above, and thus, detailed description thereof is omitted.

Next, a process regarding recognition of the "release operation" is described. As a result of the determination in step S58 in FIG. 37, when the flicking operation has not been performed (NO in step S58), the processor 81 next executes a release operation recognition process in step S59. In this process, a process of recognizing whether or not the release operation as described above has been performed, is executed.

Figure 41:
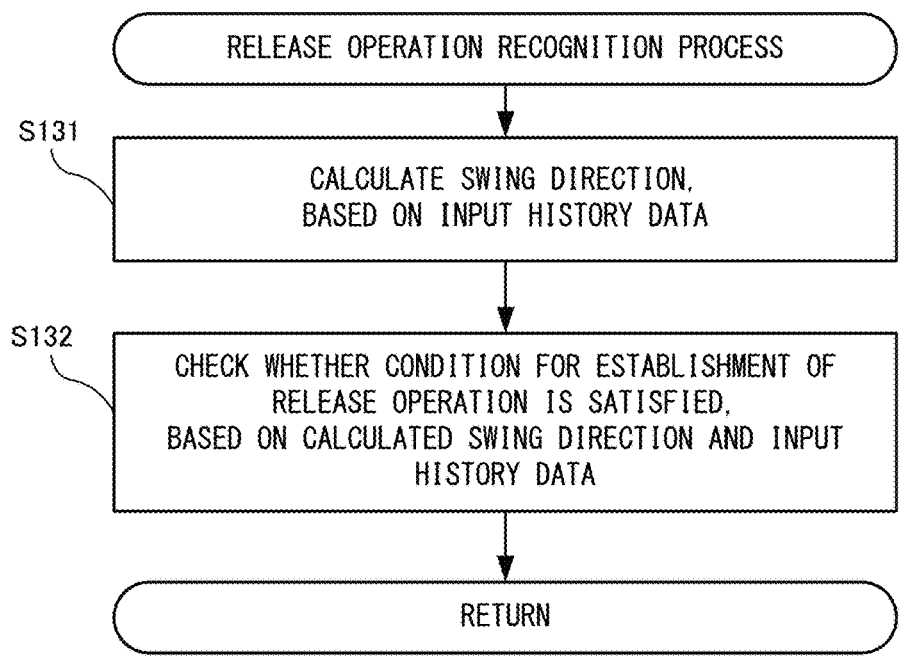
FIG. 41 is a non-limiting example of a flowchart showing details of a release operation recognition process.

FIG. 41 is a flowchart showing details of the release operation recognition process. In FIG. 41, first, in step S131, the processor 81 calculates a "swing direction" in the release operation on the basis of the input history data 309. In this release operation, the input trajectory is made as "end in a predetermined direction→center" in several frames, and thus, a direction toward the center is calculated as the swing direction. Specifically, the processor 81 calculates the swing direction as follows.

(C1) First, the processor 81 calculates a vector from the center point to the input coordinate of 10 frames before, normalizes this vector, and multiplies the resultant vector by a minus sign.

(C2) Next, the processor 81 calculates the inner product of the above vector multiplied by a minus sign and the displacement amount (vector) of the input in each of the last several frames (e.g., 5 frames), and calculates the sum of vectors whose inner product values are positive values.

(C3) Then, the processor 81 normalizes the calculated vector, thereby obtaining the swing direction.

Next, in step S132, on the basis of the calculated swing direction and the input history data 309, the processor 81 determines whether or not conditions for determining that the release operation is established are satisfied. Specifically, the processor 81 determines whether or not each of two conditions below is satisfied. Then, the processor 81 generates data indicating the determination result of each condition, and temporarily stores the generated data in the DRAM 85. In the exemplary embodiment, when all of the following <release operation condition 1> and <release operation condition 2> are satisfied, it is determined that the release operation has been performed.

<Release Operation Condition 1> That the Input Trajectories are Substantially in the Same Direction.

Figure 42:
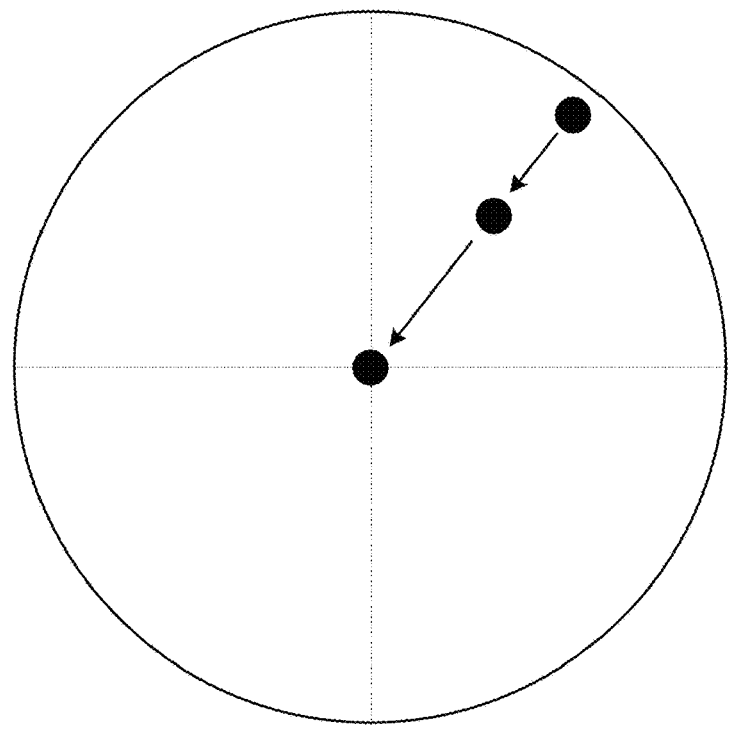
FIG. 42 illustrates a non-limiting example of the release operation recognition process.

When a release operation has been performed, the input trajectory from the end to the center is considered to be a substantially straight trajectory as shown in FIG. 42. Thus, this condition is used as the determination condition for the release operation. Specifically, the processor 81 calculates lines from the center to the respective input coordinates for the past several frames to calculate the angle between the lines, and calculates the difference in the angles between each frame and the immediately-preceding frame. Then, the processor 81 determines whether or not the sum of the respective angle differences is not greater than a predetermined threshold, and when the sum is not greater than the predetermined threshold, the processor 81 determines that this condition is satisfied (i.e., the trajectory is substantially straight).

<Release Operation Condition 2> That in an Immediately Preceding Period Having a Certain Length, the Number of Frames in which the Stick Position Stayed in the Vicinity of the End is not Less than a Certain Value.

This condition is for excluding the above-described fast random input operation. The "immediately preceding period having a certain length" is, for example, a period corresponding to the last 7 frames. In this period, when the number of frames in which the input coordinate was in the end region 131 is not less than 4, it is determined that this condition is satisfied.

Upon ending of the condition checking process regarding the release operation in step S132, the release operation recognition process ends.

With reference back to FIG. 37, next, in step S60, on the basis of data indicating the determination result of each condition in the release operation recognition process, the processor 81 determines whether or not the release operation has been performed. That is, the processor 81 determines whether or not all of the above-described two conditions are satisfied, and when all of the two conditions are satisfied, the processor 81 determines that the release operation has been performed. As a result of this determination, when the release operation has been performed (YES in step S60), the processor 81 performs, in step S61, setting for causing the player object 201 to perform the swinging action. The setting contents in this case are for causing a swinging action based on this release operation to be performed. Specifically, first, the processor 81 sets the "swinging state" in the PO state information 308. Next, the processor 81 sets, in the sword swing parameters 310, various values related to motions of the sword 204 and the player object 201 such that a motion of a sword swinging action corresponding to the calculated swing direction is performed. For example, when a release operation of "right end→center" has been performed, the contents of the sword swing parameters 310 are set such that a motion in which the player object 201 swings the sword 204 in the left direction from the orientation of holding the sword in the right direction during posturing is displayed (reproduced) over a predetermined number of frames. Upon ending of the setting, the processor 81 ends the held-sword swing recognition process.

Meanwhile, as a result of the determination in step S60, when the release operation has not been performed (NO in step S60), it means that the operation of executing the swinging action in the posturing state has not been performed. In this case, the processor 81 ends the held-sword swing recognition process.

With reference back to FIG. 34, next, in in step S36, the processor 81 determines whether or not, as a result of the held-sword swing recognition process, the PO state has changed to the "swinging state". As a result of this determination, when the PO state is not the "swinging state" (NO in step S36), the processor 81 performs, in step S37, a process of changing the position and the orientation of the sword 204 on the basis of the direction input operation performed on the right stick 52. That is, a process of moving the sword 204 in accordance with the input of the right stick 52, i.e., the posturing action, is executed. Meanwhile, when the PO state is the "swinging state" (YES in step S36), the process of step S37 is skipped, and the posturing action process ends.

Next, a case where, as a result of the determination in step S32, the operation mode is the second operation mode (NO in step S32) is described. In this case, in step S40 in FIG. 35, the processor 81 determines whether or not an operation for ending the posturing state in the second operation mode has been performed. In the exemplary embodiment, this ending operation is pressing a predetermined button as in the case of the first operation mode.

As a result of the determination above, when the operation for ending the posturing state has been performed (YES in step S40), the processor 81 sets, in step S41, the non-sword-drawn state in the PO state information 308. Then, the posturing action process ends.

Meanwhile, as a result of the determination in step S40, when the operation for ending the posturing state has not been performed (NO in step S40), the processor 81 next determines, in step S42, whether or not an acceleration having not less than a predetermined value has occurred, on the basis of the inertial sensor data 306. This predetermined value is a magnitude of acceleration that is sufficient to allow determination of "having swung" the right controller 4. That is, whether or not the right controller 4 has been swung at not less than a predetermined speed is determined. As a result of this determination, when the value of the acceleration is less than the predetermined value (NO in step S42), the processor 81 calculates, in step S43, an orientation of the right controller 4 on the basis of acceleration data and angular velocity data included in the inertial sensor data 306.

Next, in step S44, the processor 81 calculates an orientation and a position the sword 204 so as to correspond to the calculated orientation of the right controller 4. Accordingly, the posturing action using the inertial sensors is realized. Then, the posturing action process ends.

Meanwhile, as a result of the determination in step S42, when the value of the acceleration is not less than the predetermined value (YES in step S42), the transition condition from the posturing state to the swinging state in the second operation mode is satisfied. In this case, in step S45, the processor 81 sets the "swinging state" in the PO state information 308.

Next, in step S46, on the basis of acceleration data included in the inertial sensor data 306, the processor 81 sets a moving direction and a moving speed of the sword 204 in the next frame. Specifically, the processor 81 calculates the direction in which the right controller 4 has been swung, on the basis of the acceleration data above. Then, the processor 81 sets the contents of the sword swing parameters 310 such that the calculated direction indicates the moving direction of the sword 204 in the next frame. Further, the processor 81 calculates the speed at which the right controller 4 has been swung, on the basis of the acceleration data above. Then, the processor 81 sets the contents of the sword swing parameters 310 such that the calculated speed indicates the moving speed of the sword 204 in the next frame.

It should be noted that, in the process of step S46, whether or not change in the acceleration in the past several frames satisfies a predetermined condition may be determined, and when the predetermined condition is satisfied, the sword swing parameters 310 may be set such that the above-described "rotating slash" is performed.

Then, the posturing action process ends. Upon ending of the posturing action process, the processing is advanced to step S8.

[Swinging Action Process]

Figure 43:
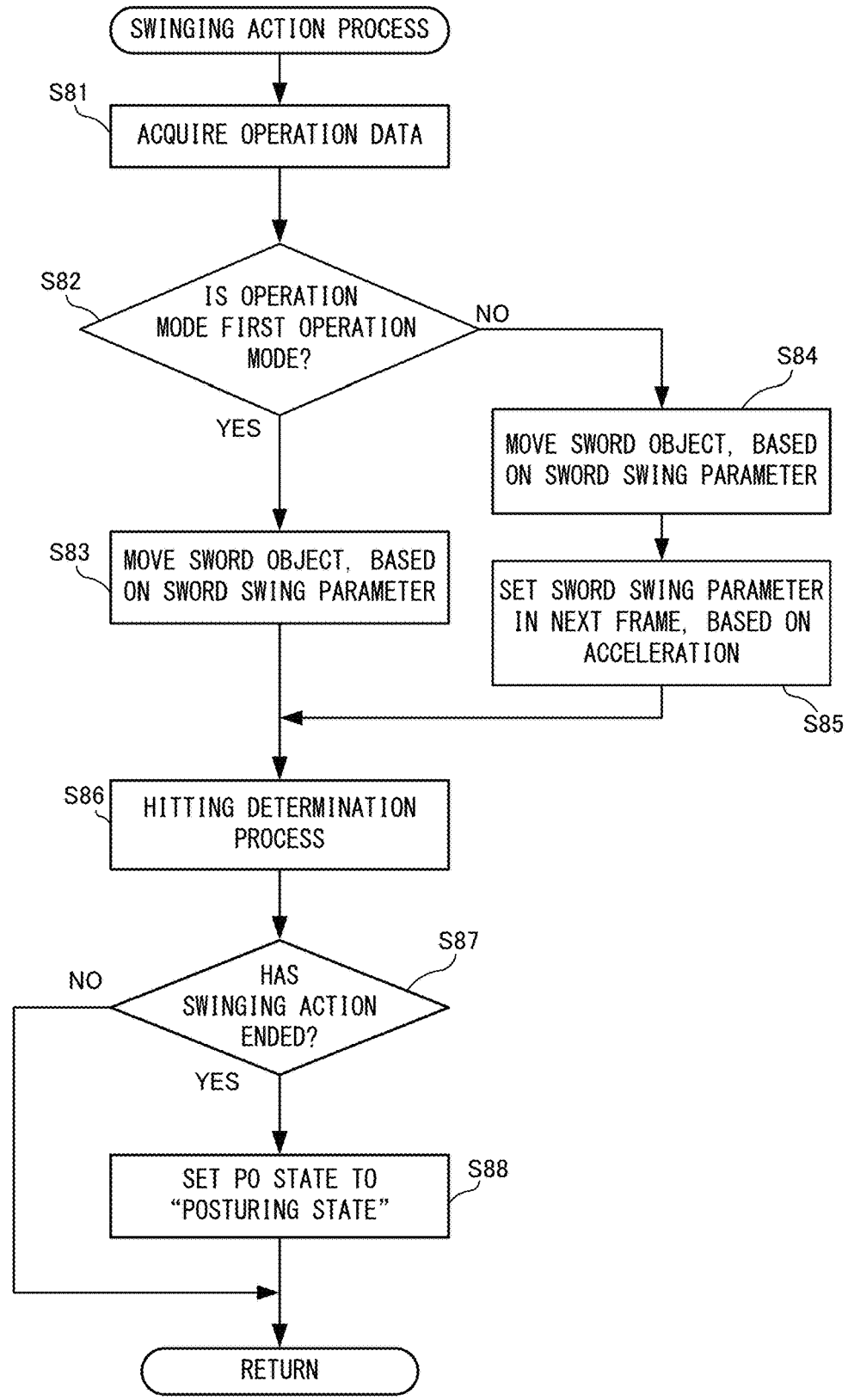
FIG. 43 is a non-limiting example of a flowchart showing details of a swinging action process.

Next, details of the swinging action process in step S11 is described. FIG. 43 is a flowchart showing details of the swinging action process. In FIG. 43, first, in step S81, the processor 81 acquires the operation data 302.

Next, in step S82, the processor 81 determines whether or not the operation mode is the first operation mode. As a result of this determination, when the operation mode is the first operation mode (YES in step S82), the processor 81 moves the sword 204 and, in addition, changes the orientation of the sword 204 on the basis of the contents of the sword swing parameters 310, in step S83. That is, in the case of the first operation mode, the motion of the swinging action set in the sword swing recognition process above is reproduced. Then, the processing is advanced to step S86 described later.

Meanwhile, as a result of the determination in step S82, when the operation mode is the second operation mode (NO in step S82), the processor 81 moves the sword 204 on the basis of the contents of the sword swing parameters 310, in step S84.

Next, in step S85, the processor 81 sets a moving direction and a moving speed of the sword 204 in the next frame, on the basis of the acceleration data above. That is, in the case of the second operation mode, a moving direction and a moving speed of the sword 204 are set on the basis of acceleration for each frame while the swinging action is being performed.

It should be noted that, with respect to the processes of the steps S84 and S85, in a case where parameters for a "rotating slash" have been set in the sword swing parameters 310 in step S46 above, a process of moving the sword 204 such that a motion of the rotating slash is performed, is executed.

Next, in step S86, the processor 81 performs a hitting determination process. That is, whether or not the sword 204 has contacted a predetermined object is determined. The determination result is stored in the DRAM 85 as appropriate, and various game processes based on the hitting determination result are executed in other game processes in step S8.

Next, in step S87, the processor 81 determines whether or not the swinging action has ended. For example, whether or not the swinging action (display of the sword swinging motion) has ended is determined on the basis of, for example, whether or not a time corresponding to a predetermined number of frames since the start of the swinging action has elapsed. As a result of this determination, when the swinging action has ended (YES in step S87), the processor 81 sets, in step S88, data indicating the posturing state in the PO state information 308. Accordingly, transition from the swinging state to the posturing state is performed. Then, the swinging action process ends. Meanwhile, when the swinging action has not ended (NO in step S87), the process of step S88 is skipped, and the swinging action process ends.

This is the end of detailed description of the game processing according to the exemplary embodiment.

As described above, in the exemplary embodiment, the player object 201 can be caused to perform a movement of swinging the sword 204, through a simple operation of direction input of the analog stick. In addition, as the operation method for causing this movement to be performed, three types of operation methods, i.e., the "flicking operation", the "opposite-direction input operation", and the "release operation" as described above, are provided to the user. The user can cause the player object 201 to perform the movement of swinging the sword 204, by using any of the above operation methods. Accordingly, with respect to the movement of swinging the sword 204, a variety of operation methods can be provided to the player, and the convenience for the player can be enhanced.

[Modification]

In the above sword swing recognition process, the process is performed in the order of the "rotating slash operation", the "opposite-direction input operation", the "flicking operation", and the "release operation". However, the order of the processes may be switched. In addition, as for the flow of the sword swing recognition process, the conditions related to the above operations may be collectively checked first, and then, on the basis of the determination result, whether or not any of the operations is established may be determined.

With respect to the end region 131 and the center region 132, in the examples in FIG. 27 and FIG. 30, both regions are set so as to have an interval therebetween. Not limited thereto, the sizes of the respective regions may be set such that the boundaries of the end region 131 and the center region 132 have the same value (i.e., such that there is no interval therebetween).

In the example in the above exemplary embodiment, a case where the analog stick is used in the first operation mode has been described. The input device is not limited to the analog stick. The above processes can be applied also when using an analog-input-type direction input device that realizes a predetermined neutral position when there is no input. For example, the above processes can be applied to a slide pad, a pressure-sensitive-type stick, or the like. Further, the above processes can also be applied to, for example, a virtual joy stick formed on a touch panel, in addition to the direction input device.

In the example in the above exemplary embodiment, for the sword swinging action, three types of operation methods are provided to the user. However, in another exemplary embodiment, only two of the three types may be provided.

In the example in the above exemplary embodiment, a case where the sword 204 is swung has been described. However, the above processes can be applied also when another type of the weapon object is used as long as the weapon is one that is to be swung while being held with a hand. For example, the weapon may be a club, an ax, or the like.

In the above exemplary embodiment, a case where a series of processes regarding the game processing are executed in a single apparatus has been described. However, in another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes may be executed by the server-side apparatus. Further, in an information processing system including a terminal-side apparatus and a server-side apparatus communicable with the terminal-side apparatus via a network, major processes among the series of processes may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the main body apparatus 2 sends operation data indicating operations performed by the user to a predetermined server; various game processes are executed in the server; and the execution result is streaming-distributed as a moving image/sound to the main body apparatus 2.

While the exemplary embodiment has been described in detail, the foregoing description is in all aspects illustrative and not restrictive. It is to be understood that various modifications and variations can be made without departing from the scope of the exemplary embodiment.

What is claimed is:

1. A computer-readable non-transitory storage medium having stored therein instructions that, when executed by a processor of an information processing system, cause the processor to:

control, in a virtual space, a player object having an item object;

cause, on the basis of a fact that a first direction input has been performed on an operation device, the player object to perform a posturing action of holding the item object in an orientation corresponding to a first input direction according to the first direction input;

in a case where the player object is performing the posturing action, cause, on the basis of a fact that a second direction input has been performed on the operation device, the player object to perform a first swinging action of swinging the item object in an orientation corresponding to a second input direction according to the second direction input; and on the basis of a fact that a going-way direction input in which a displacement amount with respect to an origin in an input on the operation device and in a state of being not greater than a first value enters a state of exceeding at least the first value, and a return-way direction input in which the displacement amount enters a state of being not greater than a second value after the going-way direction input have been performed within a first time on the operation device, cause the player object to perform a second swinging action of swinging the item object in an orientation based on at least one of a going-way input direction according to the going-way direction input and a return-way input direction according to the return-way direction input.

2. The storage medium according to claim 1, wherein the instructions cause the processor to cause the player object to perform the second swinging action on the basis of a fact that the going-way direction input in which the displacement amount in the state of being not greater than the first value increases to be not less than a third value, which is greater than the first value, and the return-way direction input have been performed within the first time.

3. The storage medium according to claim 1, wherein the instructions cause the processor to cause, in a case where the player object is performing the posturing action, the player object to perform the first swinging action on the basis of a fact that, as the second direction input, a direction input in which the displacement amount being not less than a fourth value becomes less than the fourth value and then becomes not less than a fifth value has been performed.

4. The storage medium according to claim 1, wherein the first input direction and the second input direction are directions that are opposite to each other with respect to the origin.

5. The storage medium according to claim 1, wherein
in a state where no input is performed on the operation device by a user, the displacement amount becomes not greater than a predetermined value, or the displacement amount is gradually reduced so as to be not greater than the predetermined value after a lapse of a predetermined time.

6. The storage medium according to claim 1, wherein
the operation device includes a stick device and outputs input direction data corresponding to a tilt of the stick device.

7. The storage medium according to claim 1, wherein
in a case where a positional relationship between coordinates indicated by temporally-consecutive two pieces of input data acquired from the operation device is a positional relationship in which an origin region whose center is the origin is between the coordinates, the instructions further cause the processor to determine that an input onto the origin region has been performed.

8. The storage medium according to claim 1, wherein
in a case where an angle difference between the going-way input direction and the return-way input direction is in a predetermined range, the instructions cause the processor to cause the player object to perform the second swinging action.

9. The storage medium according to claim 1, wherein
the instructions cause the processor to cause the player object to perform the second swinging action, on the basis of a fact that the going-way direction input in which, after the state of the displacement amount being not greater than the first value has continued for not less than a predetermined time, the displacement amount increases to exceed the first value, and then, further the return-way direction input in which the displacement amount decreases to be not greater than the second value have been performed within the first time.

10. The storage medium according to claim 1, wherein
the instructions cause the processor to cause the player object to perform the second swinging action, further on a condition that a total distance of trajectories of input coordinates in an immediately preceding predetermined time is not greater than a certain value.

11. The storage medium according to claim 1, wherein
the instructions further cause the processor to cause the player object to perform a third swinging action of swinging the item object, in accordance with cancelation of the first direction input.

12. The storage medium according to claim 1, wherein
in a case where the player object is performing the posturing action in a state of the displacement amount being not less than a sixth value, when the second direction input in which the displacement amount in a state of being not less than the sixth value enters a state of being less than the sixth value, and then enters a state of being not less than a seventh value, and after the second direction input, a third direction input in which the displacement amount enters a state of being less than the seventh value and then returns to the state of being not less than the sixth value have been performed within a predetermined time on the operation device, the instructions further cause the processor to cause the player object to perform a fourth swinging action of swinging the item object by rotating about an axis orthogonal to a direction, in the virtual space, that corresponds to a direction according to the second or third direction inputs.

13. The storage medium according to claim 1, wherein
the operation device further includes an inertial sensor, and
the instructions further cause the processor to:
in a first operation mode, cause the player object to perform the posturing action and the first swinging action on the basis of a fact that the first direction input and the second direction input have been performed; and
in a second operation mode,
cause the player object to perform the posturing action on the basis of an orientation of the operation device, and
cause the player object to perform at least one of the first swinging action and the second swinging action on the basis of a swing input performed on the operation device.

14. The storage medium according to claim 1, wherein
the item object is a weapon object for attacking an enemy object by the first swinging action or the second swinging action.

15. A game apparatus comprising at least one processor, the processor being configured to:
control, in a virtual space, a player object having an item object;
cause, on the basis of data indicating a first direction input which has been performed on and outputted from an operation device capable of providing a direction input, the player object to perform a posturing action of holding the item object in an orientation corresponding to an input direction according to the first direction input;
in a case where the player object is performing the posturing action, cause, on the basis of a fact that a second direction input has been performed on the operation device, the player object to perform a first swinging action of swinging the item object in an orientation corresponding to a second input direction according to the second direction input; and
on the basis of a fact that a going-way direction input in which a displacement amount with respect to an origin in an input on the operation device and in a state of being not greater than a first value enters a state of exceeding at least the first value, and a return-way direction input in which the displacement amount enters a state of being not greater than a second value after the going-way direction input have been performed within a first time on the operation device, cause the player object to perform a second swinging action of swinging the item object in an orientation based on at least one of a going-way input direction according to the going-way direction input and a return-way input direction according to the return-way direction input.

16. A game system comprising at least one processor, the processor being configured to:
control, in a virtual space, a player object having an item object;
cause, on the basis of data indicating a first direction input which has been performed on and outputted from an operation device capable of providing a direction input, the player object to perform a posturing action of holding the item object in an orientation corresponding to an input direction according to the first direction input;
in a case where the player object is performing the posturing action, cause, on the basis of a fact that a second direction input has been performed on the operation device, the player object to perform a first swinging action of swinging the item object in an orientation corresponding to a second input direction according to the second direction input; and on the basis of a fact that a going-way direction input in which a displacement amount with respect to an origin in an input on the operation device and in a state of being not greater than a first value enters a state of exceeding at least the first value, and a return-way direction input in which the displacement amount enters a state of being not greater than a second value after the going-way direction input have been performed within a first time on the operation device, cause the player object to perform a second swinging action of swinging the item object in an orientation based on at least one of a going-way input direction according to the going-way direction input and a return-way input direction according to the return-way direction input.

17. A game processing method executed by a processor configured to control an information processing system, the game processing method causing the processor to:

control, in a virtual space, a player object having an item object;

cause, on the basis of a first direction input performed on an operation device capable of providing a direction input, the player object to perform a posturing action of holding the item object in an orientation corresponding to an input direction according to the first direction input;

in a case where the player object is performing the posturing action, cause, on the basis of a fact that a second direction input has been performed on the operation device, the player object to perform a first swinging action of swinging the item object in an orientation corresponding to a second input direction according to the second direction input; and on the basis of a fact that a going-way direction input in which a displacement amount with respect to an origin in an input on the operation device and in a state of being not greater than a first value enters a state of exceeding at least the first value, and a return-way direction input in which the displacement amount enters a state of being not greater than a second value after the going-way direction input have been performed within a first time on the operation device, cause the player object to perform a second swinging action of swinging the item object in an orientation based on at least one of a going-way input direction according to the going-way direction input and a return-way input direction according to the return-way direction input.

* * * * *